United States Patent
Zhang et al.

(10) Patent No.: US 10,616,604 B2
(45) Date of Patent: Apr. 7, 2020

(54) COEFFICIENT LEVEL CODING IN VIDEO CODING

(71) Applicant: QUALCOMM Incorporated, San Diego, CA (US)

(72) Inventors: Li Zhang, San Diego, CA (US); Marta Karczewicz, San Diego, CA (US); Jianle Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 599 days.

(21) Appl. No.: 15/252,986

(22) Filed: Aug. 31, 2016

(65) Prior Publication Data

US 2017/0064336 A1 Mar. 2, 2017

Related U.S. Application Data

(60) Provisional application No. 62/212,996, filed on Sep. 1, 2015.

(51) Int. Cl.
| | | |
|---|---|---|
| *H04N 19/61* | (2014.01) | |
| *H04N 19/124* | (2014.01) | |
| *H04N 19/96* | (2014.01) | |
| *H04N 19/122* | (2014.01) | |
| *H04N 19/70* | (2014.01) | |
| *H04N 19/196* | (2014.01) | |
| *H04N 19/13* | (2014.01) | |
| *H04N 19/18* | (2014.01) | |
| *H04N 19/593* | (2014.01) | |
| *H04N 19/176* | (2014.01) | |

(52) U.S. Cl.
CPC .......... *H04N 19/61* (2014.11); *H04N 19/122* (2014.11); *H04N 19/124* (2014.11); *H04N 19/13* (2014.11); *H04N 19/18* (2014.11); *H04N 19/197* (2014.11); *H04N 19/593* (2014.11); *H04N 19/70* (2014.11); *H04N 19/96* (2014.11); *H04N 19/176* (2014.11)

(58) Field of Classification Search
CPC ...... H04N 19/61; H04N 19/124; H04N 19/96; H04N 19/122; H04N 19/176
USPC .................................................. 375/240.12
See application file for complete search history.

(56) References Cited

U.S. PATENT DOCUMENTS

| | | | |
|---|---|---|---|
| 9,866,829 B2 | 1/2018 | Joshi et al. | |
| 2013/0114693 A1 | 5/2013 | Gao et al. | |
| 2014/0362925 A1* | 12/2014 | Nguyen | H03M 7/4018 |
| | | | 375/240.18 |

FOREIGN PATENT DOCUMENTS

| | | |
|---|---|---|
| CN | 102300085 A | 12/2011 |
| WO | 2013107908 A1 | 7/2013 |
| WO | WO-2013109914 A1 | 7/2013 |

OTHER PUBLICATIONS

Wiegand et al., "WD1: Working Draft 1 of High-Efficiency Video Coding", JCTVC-C403, 3rd Meeting: Guangzhou, CN, Oct. 7-15, 2010, (Joint Collaborative Team on Video Coding of ISO/IEC JTC1/SC29/WG11 and ITU-T SG.16); Jan. 6, 2011, 137 pp.

(Continued)

*Primary Examiner* — On S Mung
(74) *Attorney, Agent, or Firm* — Shumaker & Sieffert, P.A.

(57) ABSTRACT

A video coder, such as a video encoder or a video decoder, uses a first Rice parameter derivation method and a second Rice parameter derivation method for coding coefficient levels of the TU. The first Rice parameter derivation method is a statistics-based derivation method. The second Rice parameter derivation method is a template-based derivation method.

28 Claims, 14 Drawing Sheets

(56) References Cited

OTHER PUBLICATIONS

Wiegand et al., "WD2: Working Draft 2 of High-Efficiency Video Coding," JCTVC-D503, 4th Meeting: Daegu, KR, Jan. 20-28, 2011, (Joint Collaborative Team on Video Coding of ISO/IEC JTC1/SC29/WG11 and ITU-T SG.16); Apr. 15, 2011, 153 pp.
Wiegand et al., "WD3: Working Draft 3 of High-Efficiency Video Coding," Document JCTVC-E603, 5th Meeting: Geneva, CH, Mar. 16-23, 2011,(Joint Collaborative Team on Video Coding of ISO/IEC JTC1/SC29/WG11 and ITU-T SG.16); May 9, 2015, 193 pp.
Bross et al., "WD4: Working Draft 4 of High-Efficiency Video Coding," 6th Meeting: Torino, IT, Jul. 14-22, 2011, (Joint Collaborative Team on Video Coding of ISO/IEC JTC1/SC29/WG11 and ITU-T SG.16);JCTVC-F803_d2, Oct. 4, 2011, 226 pp.
Bross et al., "WD5: Working Draft 5 of High-Efficiency Video Coding," 7th Meeting: Geneva, Switzerland, Nov. 21-30, 2011, (Joint Collaborative Team on Video Coding of ISO/IEC JTC1/SC29/WG11 and ITU-T SG.16);JCTVC-G1103_d2, Dec. 30, 2011, 214 pp.
Bross et al., "High efficiency video coding (HEVC) text specification draft 6," 8th Meeting: San Jose, CA, USA, Feb. 1-10, 2012, (Joint Collaborative Team on Video Coding of ISO/IEC JTC1/SC29/WG11 and ITU-T SG.16); JCTVC-H1003, Apr. 2, 2012, 259 pp.
Bross et al., "High efficiency video coding (HEVC) text specification draft 7," 9th Meeting: Geneva, CH, Apr. 27-May 7, 2012, (Joint Collaborative Team on Video Coding of ISO/IEC JTC1/SC29/WG11 and ITU-T SG.16); JCTVC-I1003_d2, Jun. 1, 2012, 290 pp.
Bross et al., "High efficiency video coding (HEVC) text specification draft 8," 10th Meeting: Stockholm, SE, Jul. 11-20, 2012, (Joint Collaborative Team on Video Coding of ISO/IEC JTC1/SC29/WG11 and ITU-T SG.16); JCTVC-J1003_d7, Jul. 28, 2012, 261 pp.
Bross et al., "High efficiency video coding (HEVC) text specification draft 9," 11th Meeting: Shanghai, CN, Oct. 10-19, 2012, (Joint Collaborative Team on Video Coding of ISO/IEC JTC1/SC29/WG11 and ITU-T SG.16); JCTVC-K1003_v7, Nov. 2, 2012, 290 pp.
Bross et al., "High efficiency video coding (HEVC) text specification draft 10 (For FDIS & Last Call)," 12th Meeting: Geneva, CH, Jan. 14-23, 2013, (Joint Collaborative Team on Video Coding of ISO/IEC JTC1/SC29/WG11 and ITU-T SG.16); JCTVC-L1003_v34, Mar. 19, 2013, 310 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.
ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
Nguyen, et al., "Non-CE11: Proposed Cleanup for Transform Coefficient Coding," Feb. 1-10, 2012; (Joint Collaborative Team on Video Coding of ISO/IEC JTC1/SC29/WG11 and ITU-T SG.16); No. JCTVC-H0228, Version 3, Jan. 27, 2012, 9 pp.
Chien, et al. "On coefficient level remaining coding," Apr. 27-May 7, 2012; (Joint Collaborative Team on Video Coding of ISO/IEC JTC1/SC29/WG11 and ITU-T SG.16); No. JCTVC-I0487, May 3, 2012; 8 pp.
Wang, et al., "High Efficiency Video Coding (HEVC) Defect Report," Jul. 25-Aug. 2, 2013, (Joint Collaborative Team on Video Coding of ISO/IEC JTC1/SC29/WG11 and ITU-T SG.16); No. JCTVC-N1003_v1, Sep. 27, 2013; 311 pp.

Karczewicz, et al., "RCE2: Results of Test 1 on Rice Parameter Initialization," Jan. 9-17, 2014; (Joint Collaborative Team on Video Coding of ISO/IEC JTC1/SC29/WG11 and ITU-T SG.16); No. JCTVC-P0199_r2, Version 3, Jan. 14, 2014; 12 pp.
"Transform Coding Using the Residual Quadtree (RQT)," Fraunhofer HHI, retrieved on Jun. 28, 2016 from https://www.hhi.fraunhofer.de/index.php?id=25&L=1, 2 pp.
Sole, et al. "Transform Coefficient Coding in HEVC," IEE Transactions on Circuits and Systems for Video Technology, vol. 22, No. 12, Dec. 2012, pp. 1765-1777.
U.S. Appl. No. 15/166,153, filed by Li Zhang on May 26, 2016.
Chen, et al., "Further improvements to HMKTA-1.0," ITU—Telecommunications Standardization Sector, Jun. 19-26, 2015, No. VCEG-AZ07, 9 pp.
Chen, et al., "Further improvements to HMKTA-1.0," ITU—Telecommunications Standardization Sector, Jun. 19-26, 2015, No. VCEG-AZ07_v2, 9 pp.
Guo, et al. "CE6 Subtest d: Intra Prediction with Secondary Boundary", Nov. 21-30, 2011; (Joint Collaborative Team on Video Coding (JCT-VC) of ITU-T SG16 WP3 and ISO/IEC JTC1/SC29/WG11), Doc. JCTVC-G280, 7th Meeting: Geneva, CH, Nov. 22, 2011; 16 pp.
Nguyen, et al., "Non-CE11: Proposed Cleanup for Transform Coefficient Coding", Feb. 1-10, 2012, 8th Meeting: San José, CA, USA, (Joint Collaborative Team on Video Coding (JCT-VC) of ITU-T SG16 WP3 and ISO/IEC JTC1/SC29/WG11), doc. JCTVC-H0228; Jan. 27, 2012; 9 pp.
Alshin, et al., "CE1 (subset B): Multi-parameter probability up-date for CABAC", Nov. 21-30, 2011; (Joint Collaborative Team on Video Coding (JCT-VC) of ITU-T SG16 WP3 and ISO/IEC JTC1/SC29/WG11), doc. No. JCTVC-G764, 7th Meeting: Geneva, Nov. 18, 2011; 4 pp.
Bossen, "Common HM test conditions and software reference configurations", Jan. 14-23, 2013; (Joint Collaborative Team on Video Coding (JCT-VC) of ITU-T SG16 WP3 and ISO/IEC JTC1/SC29/WG11); Doc. JCTVC-L1100, 12th Meeting, Apr. 9, 2013, 4 pp.
Flynn, et al., "High Efficiency Video Coding (HEVC) Range Extensions text s:pecification: Draft 7," JCT-VC Meeting; Mar. 27-Apr. 4, 2014; Valencia; (Joint Collaborative Team on Video Coding of ISO/IEC JTC1/SC29/WG11 and ITU-T SG.16 ); URL: http://wftp3.1tu.int/av-arch/jctvc-site/, No. JCTVC-Q1005-v4, Apr. 10, 2014, XP030116230, 363 pp. (uploaded in parts).
Karczewicz, et al., "Non-RCE2: Rice Parameter Initialization", JCT-VC Meeting; Jul. 25-Aug. 2, 2013; Vienna; (Joint Collaborative Team on Video Coding of ISO/IEC JTC1/SC29/WG11 and ITU-T SG.16); URL: http://wftp3.itu.int/av-arch/jctvc-site/,, No. JCTVC-N0181-v2, Jul. 24, 2013, XP030114665, 8 pp.
Karczewicz, et al., "RCE2: Results of Test D1 on Rice Parameter Initialization", JCT-VC Meeting; Oct. 23-Nov. 1, 2013; Geneva; (Joint Collaborative Team on Video Coding of ISO/IEC JTC1/SC29/WG11 and ITU-T SG.16); URL: http://wftp3.itu.int/av-arch/jctvc-site/,, No. JCTVC-00239-v3, Oct. 23, 2013 XP030115298, 7 pp.
McCann, et al., "High Efficiency Video Coding (HEVC) Test Model 16 (HM 16) Encoder Description," JCT-VC Meeting; Jun. 30-Jul. 7, 2014; Sapporo; (Joint Collaborative Team on Video Coding of ISO/IEC JTC1/SC29/WG11 and ITU-T SG.16); URL: http://wftp3.itu.int/av-arch/jctvc-site/,, No. JCTVC-R1002, Oct. 14, 2014, XP030116689, 60 pp.
Nguyen, et al., "Non-CE11: Proposed Cleanup for Transform Coefficient Coding," Document JCTVC-H0228, Joint Collaborative Team on Video Coding (JCT-VC) of ITU-T SG16 WP3 and ISO/IEC JTC1/SC29/WG11, 8th Meeting: San José, CA, USA, XP030111255, Feb. 1-10, 2012, 9 pp.
Sole et al., "Transform Coefficient Coding in HEVC", IEEE Transactions on Circuits and Systems for Video Technology,IEEE Service Center, Piscataway, NJ, US, vol. 22, No. 12, Dec. 2012 , pp. 1765-1777, XP011487805, ISSN: 1051-8215, DOI: 10.1109/TCSVT.2012.2223055.
International Search Report and Written Opinion from International Application No. PCT/US2016/049962, dated Nov. 7, 2016, 14 pp.

(56) References Cited

OTHER PUBLICATIONS

Chen, et al., "Coding tools investigation for the next generation video coding based on HEVC," Digital Image Processing, Proc. of SPIE vol. 9599, Feb. 2015; 9 pp.
Liu, et al., "Local Illumination Compensation," ITU-Telecommunications Standardization Sector, Study Group, Jun. 19-26, 2015, document VCEG-AZ06; 11 pp.
Chien, et al., "Extension of Advanced Temporal Motion Vector Predictor (ATMVP)," ITU-Telecommunications Standardization Sector, Study Group, Jun. 19-26, 2015, document VCEG-AZ10, 8 pp.
Chiu, et al., "Decoder-Side Motion Estimation and Wiener Filter for HEVC," Visual communications and Image Processing, Nov. 17-20, 2013, 6 pp.
Response to Written Opinion dated Nov. 7, 2016, from International Application No. PCT/US2016/049962, filed on Jan. 16, 2017, 5 pp.
Second Written Opinion from International Application No. PCT/US2016/049962, dated Jul. 11, 2017, 5 pp.
International Preliminary Report on Patentability from International Application No. PCT/US2016/049962, dated Oct. 13, 2017, 8 pp.
Karczewicz M., et al., "RCE2: Results of Test D1 on Rice Parameter Initialization Draft text", Jan. 11, 2013; Joint Collaborative Team on Video Coding (JCT-VC), 3 Pages.

\* cited by examiner

COEFFICIENT LEVEL CODING IN VIDEO CODING

This application claims the benefit of U.S. Provisional Patent Application 62/212,996, filed Sep. 1, 2015, the entire content of which is incorporated herein by reference.

TECHNICAL FIELD

This disclosure relates to video encoding and decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicates the difference between the coded block and the predictive block. An intra-coded block is encoded according to an intra-coding mode and the residual data. For further compression, the residual data may be transformed from the pixel domain to a transform domain, resulting in residual coefficients, which then may be quantized.

SUMMARY

This disclosure describes techniques related to entropy encoding and decoding in block-based hybrid video coding. For instance, this disclosure describes techniques of binarizing syntax elements for coefficient levels in entropy encoding and decoding processes. As part of binarizing a syntax element for a coefficient level, a video coder (i.e., a video encoder or a video decoder) may determine a Rice parameter K for the syntax element. A K-th order Rice code may represent the syntax element. In some examples, the proposed techniques of this disclosure may also be applied in other binarization methods in which the order K is utilized. As described herein, in some examples, the video coder may use a template-based Rice parameter derivation method and a statistics-based Rice parameter derivation method for coefficient levels of the same transform unit.

In one example, this disclosure describes a method of decoding video data, the method comprising: using a first Rice parameter derivation method and a second Rice parameter derivation method for decoding coefficient levels of a single transform unit (TU) of a current coding unit (CU) of a current picture of the video data, wherein: the first Rice parameter derivation method is a statistics-based derivation method, and the second Rice parameter derivation method is a template-based derivation method; and reconstructing a coding block of the current CU by adding samples of one or more prediction units of the current CU to corresponding samples of a transform block of the TU.

In another example, this disclosure describes a method of encoding video data, the method comprising: generating a residual block for a coding unit (CU) of a current picture of the video data, each sample in the residual block indicating a difference between a sample in a predictive block for a prediction unit (PU) of the CU and a corresponding sample in a coding block of the CU; decomposing the residual block for the CU into one or more transform blocks, wherein a transform unit (TU) of the CU comprises a transform block of the one or more transform blocks; and using a first Rice parameter derivation method and a second Rice parameter derivation method for encoding coefficient levels of the TU, wherein: the first Rice parameter derivation method is a statistics-based derivation method, and the second Rice parameter derivation method is a template-based derivation method.

In another example, this disclosure describes a device for coding video data, the device comprising: a computer-readable storage medium configured to store the video data; and one or more processors configured to: use a first Rice parameter derivation method and a second Rice parameter derivation method for coding coefficient levels of a single transform unit (TU) of a current coding unit (CU) of a current picture of the video data, wherein: the first Rice parameter derivation method is a statistics-based derivation method, and the second Rice parameter derivation method is a template-based derivation method.

In another example, this disclosure describes a device for coding video data, the device comprising: means for storing the video data; and means for using a first Rice parameter derivation method and a second Rice parameter derivation method for coding coefficient levels of a single transform unit (TU) of a current coding unit (CU) of a picture of the video data, wherein: the first Rice parameter derivation method is a statistics-based derivation method, and the second Rice parameter derivation method is a template-based derivation method.

The details of one or more examples of the disclosure are set forth in the accompanying drawings and the description below. Other features, objects, and advantages will be apparent from the description, drawings, and claims.

DETAILED DESCRIPTION

Figure 1:
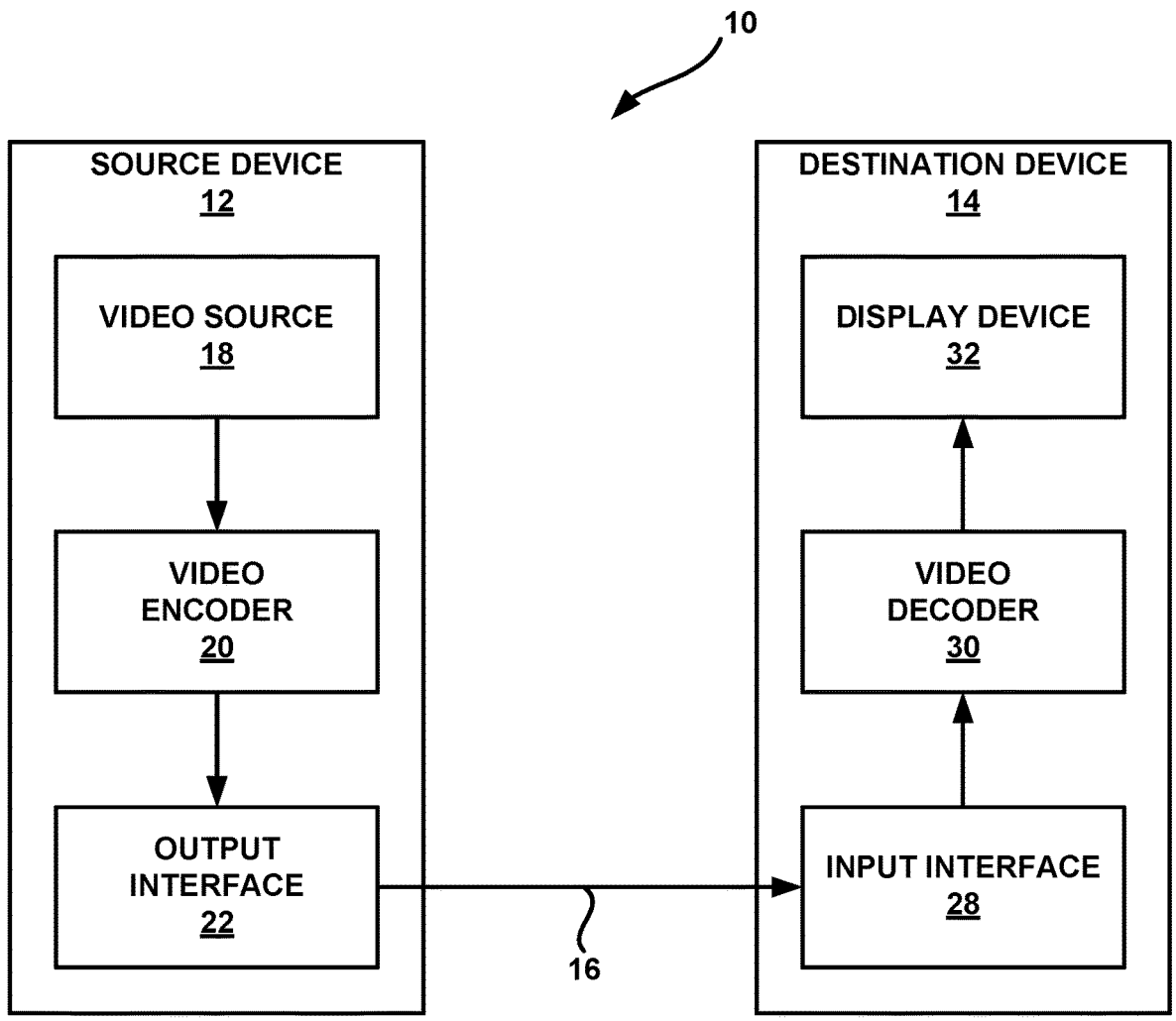
FIG. 1 is a block diagram illustrating an example video coding system that may utilize the techniques described in this disclosure.

This disclosure describes techniques that may relate to an entropy coding module in block based hybrid video coding, especially for coefficient level coding. The techniques may be applied to existing video codecs, such as HEVC (High Efficiency Video Coding) codecs or may be an efficient coding tool in future video coding standards.

In various video encoding techniques, particular syntax elements are entropy encoded to reduce the number of bits required to represent the syntax elements. As part of entropy encoding a syntax element, a video encoder may binarize the syntax element. Binarizing a syntax element refers to a process of determining a variable length binary code that represents the syntax element. Thus, a binarized syntax element is the determined variable length binary code that represents the syntax element. The binarized syntax element may be referred to as a code word. The video encoder may encode a binarized syntax element using an arithmetic coding technique. For example, the video encoder may encode a binarized syntax element using Context Adaptive Binary Arithmetic Coding (CABAC). Conversely, a video decoder may use the arithmetic coding technique to decode the binarized syntax element. The video decoder may then debinarize the binarized syntax element to recover the original value of the syntax element. The video decoder may then use the recovered syntax element as part of a process to reconstruct one or more pictures of video data.

A video encoder may binarize a syntax element in various ways. For example, the video encoder may use Rice coding or exponential (Exp)-Golomb coding to binarize a syntax element. Rice coding depends on a Rice parameter. Larger Rice parameters are more suitable for binarizing syntax elements with larger values while smaller Rice parameters are more suitable for binarizing syntax elements with smaller values.

In HEVC and particular other block-based video coding systems, a picture is encoded using a set of coding units (CUs). Each CU of a picture may correspond to one or more co-located coding blocks within the picture. To encode a CU, a video encoder may determine predictive blocks for one or more prediction units (PUs) of the CU and may determine residual data for the CU based on samples in the predictive blocks for the PUs of the CU and corresponding samples in the coding blocks of the CU. For instance, each sample of the residual data of the CU may be equal to a difference between a sample in a predictive block of a PU of the CU and a corresponding sample of the coding block of the CU. The residual data for the CU may be partitioned into one or more transform blocks, each of which corresponds to a transform unit (TU) of the CU. The video encoder may then apply a transform, such as a discrete cosine transform, to a transform block of a TU to determine a coefficient block. The values of coefficients in the coefficient block may be referred to as "coefficient levels." For instance, in HEVC, a transform coefficient is a scalar quantity, considered to be in a frequency domain, that is associated with a particular one-dimensional or two-dimensional frequency index in an inverse transform part of the decoding process; a transform coefficient level may be an integer quantity representing a value associated with a particular two-dimensional frequency index in the decoding process prior to scaling for computation of a transform coefficient value. In some examples, the video encoder may quantize the coefficient levels in the coefficient block.

Furthermore, the video encoder may subdivide each coefficient block into one or more coefficient groups (CGs). In HEVC, each CG is a 4×4 sub-block of a coefficient block. For each respective CG of a coefficient block, the video encoder may generate a syntax element indicating whether the respective CG includes one or more non-zero coefficient levels. For each respective CG that includes one or more non-zero coefficient levels, the video encoder may represent each respective coefficient level of the respective CG using a respective set of one or more syntax elements for the respective coefficient level. The set of syntax elements for a coefficient level may include a syntax element indicating whether the coefficient level is non-zero (i.e., a significance flag syntax element), a syntax element indicating whether the coefficient level is greater than 1 (i.e., a greater1 flag), a syntax element indicating whether the coefficient level is greater than 2 (i.e., a greater2 flag), a syntax element indicating a positive or negative sign of the coefficient level (i.e., a sign flag), and a syntax element indicating a remainder value for the coefficient level (i.e., a remainder syntax element). If the significance flag indicates the coefficient level is 0, the greater1 flag, greater2 flag, sign flag, and remainder syntax element may not be present. If the significance flag indicates the coefficient level is non-zero and the greater1 flag indicates the coefficient level is not greater than 1, the greater2 flag is not present and remainder syntax element indicates the coefficient level. If the significance flag indicates the coefficient level is non-zero and the greater1 flag indicates the coefficient level is greater than 1, the greater2 flag is present. If the greater2 flag is present but indicates the coefficient level is not greater than 2, the remainder syntax element indicates the coefficient level minus 1. If the greater2 flag is present and indicates the coefficient level is greater than 2, the remainder syntax element indicates the coefficient level minus 2.

In HEVC, a video encoder may binarize remainder syntax elements having small values using Rice codes and may binarize remainder syntax elements having larger values using Exp-Golomb codes. As mentioned above, the process of determining a Rice code for a value is dependent on a Rice parameter. In HEVC, a video encoder uses a so-called "lookback-based derivation method" to set a Rice parameter used for binarizing a remainder syntax element. In the HEVC Range Extensions, a video encoder uses a so-called "statistics-based derivation method" to set a Rice parameter used for binarizing a remainder syntax element. Another technique, referred to as a "template-based derivation method" determines a Rice parameter for binarizing a remainder syntax element based on absolute values of neighboring coefficient levels covered by a local template. A template may include several relative positions compared to the position of the current coefficient in a transform block. In some examples, a template is a contiguous set of samples occurring prior, in parsing or decoding order, to a current coefficient level.

As described in further detail below, the techniques for deriving a Rice parameter in HEVC, HEVC Range Extensions, and various other prior proposals may be improved. The techniques described in this disclosure may represent an improvement over such techniques. For instance, in accordance with an example of this disclosure, a video coder (e.g., a video encoder or a video decoder) may use a first Rice parameter derivation method and a second Rice parameter derivation method for decoding coefficient levels of a single TU of a current CU of a picture. In this example, the first Rice parameter derivation method is a statistics-based derivation method and the second Rice parameter derivation method is a template-based derivation method. Thus, in this example, the video coder may use the statistics-based derivation method for some remainder syntax elements in the TU and may use the template-based derivation method for other remainder syntax elements in the same TU. This technique may allow the video coder to select Rice parameters that may result in better compression.

FIG. 1 is a block diagram illustrating an example video coding system 10 that may utilize the techniques of this disclosure. As used herein, the term "video coder" refers generically to both video encoders and video decoders. In this disclosure, the terms "video coding" or "coding" may refer generically to video encoding or video decoding.

As shown in FIG. 1, video coding system 10 includes a source device 12 and a destination device 14. Source device 12 generates encoded video data. Accordingly, source device 12 may be referred to as a video encoding device or a video encoding apparatus. Destination device 14 may decode the encoded video data generated by source device 12. Accordingly, destination device 14 may be referred to as a video decoding device or a video decoding apparatus. Source device 12 and destination device 14 may be examples of video coding devices or video coding apparatuses.

Source device 12 and destination device 14 may comprise a wide range of devices, including desktop computers, mobile computing devices, notebook (e.g., laptop) computers, tablet computers, set-top boxes, telephone handsets such as so-called "smart" phones, televisions, cameras, display devices, digital media players, video gaming consoles, in-car computers, or the like.

Destination device 14 may receive encoded video data from source device 12 via a channel 16. Channel 16 may comprise one or more media or devices capable of moving the encoded video data from source device 12 to destination device 14. In one example, channel 16 may comprise one or more communication media that enable source device 12 to transmit encoded video data directly to destination device 14 in real-time. In this example, source device 12 may modulate the encoded video data according to a communication standard, such as a wireless communication protocol, and may transmit the modulated video data to destination device 14. The one or more communication media may include wireless and/or wired communication media, such as a radio frequency (RF) spectrum or one or more physical transmission lines. The one or more communication media may form part of a packet-based network, such as a local area network, a wide-area network, or a global network (e.g., the Internet). The one or more communication media may include routers, switches, base stations, or other equipment that facilitate communication from source device 12 to destination device 14.

In another example, channel 16 may include a storage medium that stores encoded video data generated by source device 12. In this example, destination device 14 may access the storage medium, e.g., via disk access or card access. The storage medium may include a variety of locally-accessed data storage media such as Blu-ray discs, DVDs, CD-ROMs, flash memory, or other suitable digital storage media for storing encoded video data.

In a further example, channel 16 may include a file server or another intermediate storage device that stores encoded video data generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website), file transfer protocol (FTP) servers, network attached storage (NAS) devices, and local disk drives.

Destination device 14 may access the encoded video data through a standard data connection, such as an Internet connection. Example types of data connections may include wireless channels (e.g., Wi-Fi connections), wired connections (e.g., DSL, cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of a variety of multimedia applications, such as over-the-air television broadcasts, cable television transmissions, satellite television transmissions, streaming video transmissions, e.g., via the Internet, encoding of video data for storage on a data storage medium, decoding of video data stored on a data storage medium, or other applications. In some examples, video coding system 10 may be configured to support one-way or two-way video transmission to support applications such as video streaming, video playback, video broadcasting, and/or video telephony.

Video coding system 10 illustrated in FIG. 1 is merely an example and the techniques of this disclosure may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In many examples, the encoding and decoding is performed by devices that do not communicate with one another, but simply encode data to memory and/or retrieve and decode data from memory.

In the example of FIG. 1, source device 12 includes a video source 18, a video encoder 20, and an output interface 22. In some examples, output interface 22 may include a modulator/demodulator (modem) and/or a transmitter. Video source 18 may include a video capture device, e.g., a video camera, a video archive containing previously-captured video data, a video feed interface to receive video data from a video content provider, and/or a computer graphics system for generating video data, or a combination of such sources of video data.

Video encoder 20 may encode video data from video source 18. In some examples, source device 12 directly transmits the encoded video data to destination device 14 via output interface 22. In other examples, the encoded video data may also be stored onto a storage medium or a file server for later access by destination device 14 for decoding and/or playback.

In the example of FIG. 1, destination device 14 includes an input interface 28, a video decoder 30, and a display device 32. In some examples, input interface 28 includes a receiver and/or a modem. Input interface 28 may receive encoded video data over channel 16. Display device 32 may be integrated with or may be external to destination device 14. In general, display device 32 displays decoded video data. Display device 32 may comprise a variety of display devices, such as a liquid crystal display (LCD), a plasma display, an organic light emitting diode (OLED) display, or another type of display device.

Video encoder 20 and video decoder 30 each may be implemented as any of a variety of suitable circuitry, such as one or more microprocessors, digital signal processors (DSPs), application-specific integrated circuits (ASICs), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

This disclosure may generally refer to "signaling" or "transmitting" certain information to another device (e.g., to video decoder 30). The term "signaling" or "transmitting" may generally refer to the communication of syntax elements and/or other data used to decode the compressed video data. Such communication may occur in real- or near-real-time. Alternately, such communication may occur over a span of time, such as might occur when storing syntax elements to a computer-readable storage medium in an encoded bitstream at the time of encoding, which then may be retrieved by a decoding device at any time after being stored to this medium.

In some examples, video encoder 20 and video decoder 30 operate according to a video compression standard, i.e., a video coding standard. Example video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-View Video Coding (MVC) extensions. In addition, a new video coding standard, namely High Efficiency Video Coding (HEVC) or ITU-T H.265, including its Range Extensions, multi-view extension (MV-HEVC) and scalable (SHVC) extension, has recently been developed by the Joint Collaboration Team on Video Coding (JCT-VC) as well as the Joint Collaboration Team on 3D Video Coding Extension Development (JCT-3V) of ITU-T Video Coding Experts Group (VCEG) and ISO/IEC Motion Picture Experts Group (MPEG). A draft specification of HEVC, and referred to as HEVC WD or the "HEVC specification" hereinafter, is available from http://phenix.int-evey.fr/jct/doc_end_user/documents/14_Vienna/wg11/JCTVC-N1003-v1.zip.

Another draft specification of HEVC, is Bross et al., "High Efficiency Video Coding (HEVC) text specification draft 10 (for FDIS & Last Call)," Joint Collaborative Team on Video Coding (JCT-VC) of ITU-T SG 16 WP 3 and ISO/IEC JTC 1/SC 29/WG 11, 12$^{th}$ Meeting: Geneva, CH, 14-23 Jan. 2013, document JCTVC-L1003 v34, (hereinafter, "JCTVC-L1003"), which may be available at http://phenix.it-sudparis.eu/jct/doc_end_user/documents/12_Geneva/wg11/JCTVC-L1003-v34.zip. As examples, design aspects of HEVC are introduced below, focusing on the transform coefficient coding, as well as Context-Adaptive Binary Arithmetic Coding (CABAC).

In HEVC and other video coding standards, a video sequence typically includes a series of pictures. Pictures may also be referred to as "frames." A picture may include one or more sample arrays. For instance, a picture may include an array of luma samples and two arrays of chroma samples, denoted $S_L$, $S_{Cb}$, and $S_{Cr}$, respectively. $S_L$ is a two-dimensional array (i.e., a block) of luma samples. So is a two-dimensional array of Cb chroma samples. Scr is a two-dimensional array of Cr chroma samples. In other instances, a picture may be monochrome and may only include an array of luma samples.

In HEVC, the largest coding unit in a slice is called a coding tree unit (CTU). A CTU contains a quad-tree, the nodes of which are coding units. The size of a CTU can range from 16×16 to 64×64 in the HEVC main profile (although technically 8×8 CTU sizes can be supported). To generate an encoded representation of a picture (i.e., to encode the picture), video encoder 20 may generate a set of coding tree units (CTUs). Each respective CTU may be a coding tree block of luma samples, two corresponding coding tree blocks of chroma samples, and syntax structures used to code the samples of the coding tree blocks. In monochrome pictures or pictures having three separate color planes, a CTU may comprise a single coding tree block and syntax structures used to code the samples of the coding tree block. A coding tree block may be an N×N block of samples. A CTU may also be referred to as a "tree block" or a "largest coding unit" (LCU). A slice may include an integer number of CTUs ordered consecutively in a scanning order, such as a raster scanning order.

To generate an encoded CTU (i.e., to encode a CTU) in HEVC, video encoder 20 may recursively perform quad-tree partitioning on the coding tree blocks of a CTU to divide the coding tree blocks into coding blocks, hence the name "coding tree units." A coding block is an N×N block of samples. A CU may be a coding block of luma samples and two corresponding coding blocks of chroma samples of a picture that has a luma sample array, a Cb sample array and a Cr sample array, and syntax structures used to code the samples of the coding blocks. In monochrome pictures or pictures having three separate color planes, a CU may comprise a single coding block and syntax structures used to code the samples of the coding block. A CU can be the same size as a CTU, although a CU can be as small as 8×8.

Video encoder 20 may generate an encoded representation of a CU (i.e., encode the CU). As part of encoding a CU, video encoder 20 may partition a coding block of the CU into one or more prediction blocks. A prediction block may be a rectangular (i.e., square or non-square) block of samples on which the same prediction is applied. A prediction unit (PU) of a CU may be a prediction block of luma samples, two corresponding prediction blocks of chroma samples of a picture, and syntax structures used to predict the prediction block samples. Video encoder 20 may generate predictive luma, Cb and Cr blocks for luma, Cb and Cr prediction blocks of each PU of the CU. In monochrome pictures or pictures having three separate color planes, a PU may comprise a single prediction block and syntax structures used to predict the prediction block.

Video encoder 20 may use intra prediction or inter prediction to generate the predictive blocks for a PU. Each CU is coded with one of either intra prediction mode or inter prediction mode. If video encoder 20 uses intra prediction to generate the predictive blocks of a PU, video encoder 20 may generate the predictive blocks of the PU based on decoded samples of the picture associated with the PU. If video encoder 20 uses inter prediction to generate the predictive blocks of a PU, video encoder 20 may generate the predictive blocks of the PU based on decoded samples of one or more pictures other than the picture associated with the PU. When a CU is inter coded (i.e., when inter prediction is used to generate predictive blocks for PUs of the CU), the CU may be partitioned into 2 or 4 PUs or the CU may become just one PU when further partitioning does not apply. When two PUs are present in one CU, the two PUs can be half size rectangles or two rectangles with size ¼ or ¾ the size of the CU. Furthermore, when a CU is inter coded, one set of motion information is present for each PU. In addition, when a CU is inter coded, each PU of the CU is coded with a separate inter-prediction mode to derive the set of motion information.

After video encoder 20 generates predictive blocks (e.g., predictive luma, Cb and Cr blocks) for one or more PUs of a CU, video encoder 20 may generate one or more residual blocks of the CU. Each sample in a residual block of the CU indicates a difference between a sample in a predictive block for a PU of the CU and a corresponding sample in a coding block of the CU. For example, video encoder 20 may generate a luma residual block of the CU. Each sample in the luma residual block of the CU indicates a difference between a luma sample in a predictive luma block of a PU of the CU and a corresponding sample in the luma coding block of the CU. In addition, video encoder 20 may generate a Cb residual block of the CU. Each sample in the Cb residual block of the CU may indicate a difference between a Cb sample in a predictive Cb block of a PU of the CU and a corresponding sample in the Cb coding block of the CU. Video encoder 20 may also generate a Cr residual block of the CU. Each sample in the Cr residual block of the CU may indicate a difference between a Cr sample in a predictive Cr block for a PU of the CU and a corresponding sample in the Cr coding block of the CU.

Furthermore, video encoder 20 may decompose each residual block of a CU into one or more transform blocks (e.g., using quad-tree partitioning). A transform block may be a rectangular (square or non-square) block of samples on which the same transform is applied. A transform unit (TU) of a CU may be a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the luma residual block of the CU. The Cb transform block may be a sub-block of the Cb residual block of the CU. The Cr transform block may be a sub-block of the Cr residual block of the CU. In monochrome pictures or pictures having three separate color planes, a TU may comprise a single transform block and syntax structures used to transform the samples of the transform block. In some examples, the residual blocks in the same CU for luma and chroma components may be partitioned in different ways. In some examples, there is a restriction that the CU size should be equal to PU size and TU size; that is, one CU only contains one PU and one TU.

Video encoder 20 may apply one or more transforms to a transform block for a TU to generate a coefficient block for the TU. The coefficient block for the TU may comprise coefficient levels of the TU. For example, video encoder 20 may apply one or more transforms to a luma transform block for a TU to generate a luma coefficient block for the TU. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU. A coefficient block may be a two-dimensional array of transform coefficients. A transform coefficient may be a scalar quantity. As previously indicated, the value of a transform coefficient may be referred to as a coefficient level. In some examples, video encoder 20 skips application of the transform. When application of the transform is skipped for a block, the block (e.g., TU) is a "transform-skip block." Accordingly, in such examples, video encoder 20 and video decoder 30 may treat the residual samples in a transform block in the same way as transform coefficients.

After generating a coefficient block, video encoder 20 may quantize the coefficient block. Quantization generally refers to a process in which transform coefficients are quantized to possibly reduce the amount of data used to represent the transform coefficients, providing further compression. In some examples, video encoder 20 skips the step of quantizing the coefficient block. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients. Video encoder 20 may output the entropy-encoded syntax elements in a bitstream.

Video encoder 20 may output a bitstream that may include entropy-encoded syntax elements and non-entropy encoded syntax elements. The bitstream may include a sequence of bits that forms a representation of coded pictures and associated data. Thus, the bitstream may form an encoded representation of video data. The bitstream may comprise a sequence of network abstraction layer (NAL) units. Each of the NAL units includes a NAL unit header and encapsulates a raw byte sequence payload (RBSP). The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a picture parameter set (PPS), a second type of NAL unit may encapsulate an RBSP for a coded slice, a third type of NAL unit may encapsulate an RBSP for Supplemental Enhancement Information (SEI), and so on. NAL units that encapsulate RBSPs for video coding data (as opposed to RBSPs for parameter sets and SEI messages) may be referred to as video coding layer (VCL) NAL units.

In the example of FIG. 1, video decoder 30 receives a bitstream generated by video encoder 20. In addition, video decoder 30 may parse the bitstream to obtain syntax elements from the bitstream. As part of obtaining the syntax elements from the bitstream, video decoder 30 may perform entropy decoding (e.g., CABAC decoding) to obtain particular syntax elements from the bitstream. Video decoder 30 may reconstruct (i.e., decode) the pictures of the video data based at least in part on the syntax elements obtained from the bitstream. The process to reconstruct the video data may be generally reciprocal to the process performed by video encoder 20 to encode the video data. For instance, video decoder 30 may use intra prediction or inter prediction to determine predictive blocks of the PUs of a current CU. In addition, video decoder 30 may inverse quantize coefficient blocks for TUs of the current CU. Video decoder 30 may perform inverse transforms on the coefficient blocks to reconstruct transform blocks for the TUs of the current CU. Video decoder 30 may reconstruct the coding blocks of the current CU by adding the samples of the predictive blocks for PUs of the current CU to corresponding samples of the transform blocks for the TUs of the current CU. By reconstructing the coding blocks for each CU of a picture, video decoder 30 may reconstruct the picture.

As indicated above, video encoder 20 and video decoder 30 may perform CABAC coding. CABAC is a method of entropy coding first introduced in H.264/AVC and now used in HEVC. CABAC involves three main functions: binarization, context modeling, and arithmetic coding. Binarization maps syntax elements to binary symbols (bins) which are called bin strings. In other words, to apply CABAC encoding to a syntax element, the video encoder may binarize the syntax element to form a series of one or more bits, which are referred to as "bins." Context modeling estimates the probability of the bins. Finally, the binary arithmetic coder compresses the bins to bits based on the estimated probability.

As part of context modeling, the video encoder may identify a coding context. The coding context may identify probabilities of coding bins having particular values. For instance, a coding context may indicate a 0.7 probability of coding a 0-valued bin and a 0.3 probability of coding a 1-valued bin. After identifying the coding context, video encoder 20 may divide an interval into a lower sub-interval and an upper sub-interval. One of the sub-intervals may be associated with the value 0 and the other sub-interval may be associated with the value 1. The widths of the sub-intervals may be proportional to the probabilities indicated for the associated values by the identified coding context. If a bin of the syntax element has the value associated with the lower sub-interval, the encoded value may be equal to the lower boundary of the lower sub-interval. If the same bin of the syntax element has the value associated with the upper sub-interval, the encoded value may be equal to the lower boundary of the upper sub-interval. To encode the next bin of the syntax element, video encoder 20 may repeat these steps with the interval being the sub-interval associated with the value of the encoded bit. When the video encoder repeats these steps for the next bin, the video encoder may use modified probabilities based on the probabilities indicated by the identified coding context and the actual values of bins encoded.

When a video decoder performs CABAC decoding on a syntax element, video decoder 30 may identify a coding context. The video decoder may then divide an interval into a lower sub-interval and an upper sub-interval. One of the sub-intervals may be associated with the value 0 and the other sub-interval may be associated with the value 1. The widths of the sub-intervals may be proportional to the probabilities indicated for the associated values by the identified coding context. If the encoded value is within the lower sub-interval, video decoder 30 may decode a bin having the value associated with the lower sub-interval. If the encoded value is within the upper sub-interval, video decoder 30 may decode a bin having the value associated with the upper sub-interval. To decode a next bin of the syntax element, video decoder 30 may repeat these steps with the interval being the sub-interval that contains the encoded value. When video decoder 30 repeats these steps for the next bin, video decoder 30 may use modified probabilities based on the probabilities indicated by the identified coding context and the decoded bins. Video decoder 30 may then de-binarize the bins to recover the syntax element.

Rather than performing regular CABAC encoding on all syntax elements, video encoder 20 may encode some bins using bypass CABAC coding. It may be computationally less expensive to perform bypass CABAC coding on a bin than to perform regular CABAC coding on the bin. Furthermore, performing bypass CABAC coding may allow for a higher degree of parallelization and throughput. Bins encoded using bypass CABAC coding may be referred to as "bypass bins." The bypass CABAC coding engine may be simpler because the bypass CABAC coding engine does not select contexts and may assume a probability of ½ for both symbols (0 and 1). Consequently, in bypass CABAC coding, the intervals are split directly in half. Grouping bypass bins together may increase the throughput of video encoder 20 and video decoder 30. The bypass CABAC coding engine may be able to code several bins in a single cycle, whereas the regular CABAC coding engine may be able to code only a single bin in a cycle.

Thus, arithmetic coding may be based on recursive interval division. In a conventional arithmetic coder, a range, with an initial value of 0 to 1, is divided into two subintervals based on the probability of the bin. The encoded bits provide an offset that, when converted to a binary fraction, selects one of the two subintervals, which indicates the value of the decoded bin. After every decoded bin, the range is updated to equal the selected subinterval, and the interval division process repeats itself. The range and offset have limited bit precision, so renormalization may be required whenever the range falls below a certain value to prevent underflow. Renormalization can occur after each bin is decoded.

Arithmetic coding can be done using an estimated probability (context coded) (which is called regular coding mode), or assuming equal probability of 0.5 (bypass coded, which is called bypass mode). For bypass coded bins, the division of the range into subintervals can be done by a shift, whereas a look up table may be required for the context coded bins. HEVC uses the same arithmetic coding as H.264/AVC. An example of the decoding process is described in section 9.3.4.3.2.2 of JCTVC-L1003.

Several different binarization processes are used in HEVC, including unary (U), truncated unary (TU), K-th-order Exp-Golomb (EGk), and fixed length (FL). Details of the binarization processes used in HEVC may be found in JCTVC-L1003. As mentioned above, K-th order Exp-Golomb coding is one of the binarization processes used in HEVC. When order K is equal to 0, the following process may be used to generate a bin string (e.g., a string of bins) using Exp-Golomb coding for a given non-negative integer x:
1. Record x+1 in binary.
2. Count the bits written, subtract one, and record that number of starting zero bits preceding the previous bit string (i.e., record the number of bits in the binary representation of x+1, minus 1, prepended to the binary representation of x+1).

For example, let x equal 4. Thus, in step 1, the binary value 101 is recorded. In step 2, the number of bits is 3; 3 subtract 1 is 2. Hence, the prefix consists of two 0's. Therefore, the K-th order Exp-Golomb code for 4 is 00 101.

To encode a non-negative integer x in an order-k Exp-Golomb code:
1. Encode $\lfloor x/2^k \rfloor$ using order-0 Exp-Golomb code described above, then
2. Encode x mod $2^k$ in a fixed length binary value of k bits.

An equivalent way of expressing this is:
1. Encode $x+2^k-1$ using the order-0 Exp-Golomb code (i.e. encode $x+2^k$) using an Elias gamma code), then
2. Delete k leading zero bits from the encoding result.

For example, let K equal 2 and x equal 4. In this example, in step 1, $\lfloor 4/2^2 \rfloor$ is equal to 1. The 0-th order Exp-Golomb code for 1 is 010. In step 2, 4 mod $2^2$ is 0. The encoded version of 0 is a fixed-length value of 2 bits is 00. This fixed-length value is appended to the previously described 0-th order Exp-Golomb code. Thus, the final $2^{nd}$-order Exp-Golomb code for 4 is 010 00.

An example is given in the table below:

TABLE 1

Codeword of m using K-th order Exp-Golomb code

| Value m | k = 0 | k = 1 | k = 2 | k = 3 |
|---|---|---|---|---|
| 0 | 1 | 10 | 100 | 1000 |
| 1 | 010 | 11 | 101 | 1001 |
| 2 | 011 | 0100 | 110 | 1010 |
| 3 | 00100 | 0101 | 111 | 1011 |
| 4 | 00101 | 0110 | 01000 | 1100 |
| 5 | 00110 | 0111 | 01001 | 1101 |
| 6 | 00111 | 001000 | 01010 | 1110 |
| 7 | 0001000 | 001001 | 01011 | 1111 |
| 8 | 0001001 | 001010 | 01100 | 010000 |
| 9 | 0001010 | 001011 | 01101 | 010001 |

In another way of representation:

TABLE 2

Codeword of m using K-th order Exp-Golomb code

| Value m | k = 0 | Value m | k = 1 | Value m | k = 2 |
|---|---|---|---|---|---|
| 0 | 1 | 0-1 | 1X | 0-3 | 1XX |
| 1-2 | 01X | 2-5 | 01XX | 4-11 | 01XXX |
| 3-6 | 001XX | 6-13 | 001XXX | 12-27 | 001XXXX |
| 7-14 | 0001XXX | 14-29 | 0001XXXX | 28-59 | 0001XXXXX |
| 15-30 | 00001XXXX | 30-61 | 00001XXXXX | 60-123 | 00001XXXXXX |
| ... | ... | ... | ... | ... | ... |

In Table 2, the value of X could be either 0 or 1. Note that for some cases, '1' and '0' listed above could be exchanged. That is, the bin string may be led by a consecutive '1's instead of '0's.

For a K-th order Rice coder, a codeword can be generated by the following steps:

1. Fix the parameter M to an integer value (M=(1<<K).
2. For N, the number to be encoded, find
   1. quotient=q=int[N/M]
   2. remainder=r=N modulo M
3. Generate codeword
   1. The code format: <quotient code><remainder code>, where
   2. Quotient code (in unary coding)
      1. Write a q-length string of 1 bits
      2. Write a 0 bit
   3. Remainder code (in truncated binary encoding): K bits are needed For example, let K equal 2 and N equal 5. Thus, M is equal to 100 in binary (4 in decimal). In this example, the integer division quotient q of 5/4 is equal to 1; the remainder is equal to 1 (1 in binary). Thus, the quotient code is 10 (i.e., a 1-length string of 1 bits, followed by a 0 bit). The remainder code is 01 (i.e., a fixed-length code of K bits representing the remainder value 1). Hence, the $2^{nd}$-order Rice code for 5 is 1001.

The Rice codes with divisor M equal to 4, for numbers up to 15, are shown in Table 3, below:

TABLE 3

Codeword of m using K-th order Rice code (K equal to 2)

| Value | Quotient | Remainder | Code |
|---|---|---|---|
| 0 | 0 | 0 | 0 00 |
| 1 | 0 | 1 | 0 01 |
| 2 | 0 | 2 | 0 10 |
| 3 | 0 | 3 | 0 11 |
| 4 | 1 | 0 | 1 0 00 |
| 5 | 1 | 1 | 1 0 01 |
| 6 | 1 | 2 | 1 0 10 |
| 7 | 1 | 3 | 1 0 11 |
| 8 | 2 | 0 | 11 0 00 |
| 9 | 2 | 1 | 11 0 01 |
| 10 | 2 | 2 | 11 1 10 |
| 11 | 2 | 3 | 11 0 11 |
| 12 | 3 | 0 | 111 0 00 |
| 13 | 3 | 1 | 111 0 01 |
| 14 | 3 | 2 | 111 0 10 |
| 15 | 3 | 3 | 111 0 11 |

As briefly described above, the CABAC process used in HEVC and potentially other video coding specifications uses context modeling. Context modeling provides accurate probability estimation which is necessary to achieve high coding efficiency. Accordingly, context modeling is highly adaptive. Different context models can be used for different bins where the probability of the context models is updated based on the values of previously coded bins. Bins with similar distributions often share the same context model. The context model for each bin can be selected based on the type of syntax element, bin position in syntax element (binIdx), luma/chroma, neighboring information, etc.

In some examples, context switching occurs after each bin coding. Furthermore, in some examples, the probability models are stored as 7-bit entries (6-bits for the probability state and 1-bits for the most probable symbol (MPS)) in context memory and addressed using the context index computed by context selection logic.

As described briefly above, in HEVC, a CU may be partitioned into TUs according to a residual quadtree. Thus, to adapt the various characteristics of the residual blocks, a transform coding structure using the residual quadtree (RQT) is applied in HEVC, which is briefly described in the article "Transform Coding Using the Residual Quadtree (RQT)," Fraunhofer HHI which was previously available at http://www.hhi.fraunhofer.de/fields-of-competence/image-processing/researchgroups/image-video-coding/hevc-high-efficiency-video-coding/transform-coding-using-the-residual-quadtree-rqt.html, but as of Jun. 28, 2016 is available at http://www.hhi.fraunhofer.de/departments/video-coding-analytics/research-groups/image-video-coding/research-topics/hevc-high-efficiency-video-coding/transform-coding-using-the-residual-quadtree-rqt.html.

As described above, in HEVC, each picture is divided into coding tree units (CTU), which are coded in raster scan order for a specific tile or slice. A CTU is a square block and represents the root of a quadtree, i.e., the coding tree. The CTU size may range from 8×8 to 64×64 luma samples, but typically 64×64 is used. Each CTU can be further split into smaller square blocks called coding units (CUs). After the CTU is split recursively into CUs, each CU is further divided into PU and TUs. The partitioning of a CU into TUs is carried out recursively based on a quadtree approach, therefore the residual signal of each CU is coded by a tree structure namely, the RQT. The RQT allows TU sizes from 4×4 up to 32×32 luma samples.

Figure 2:
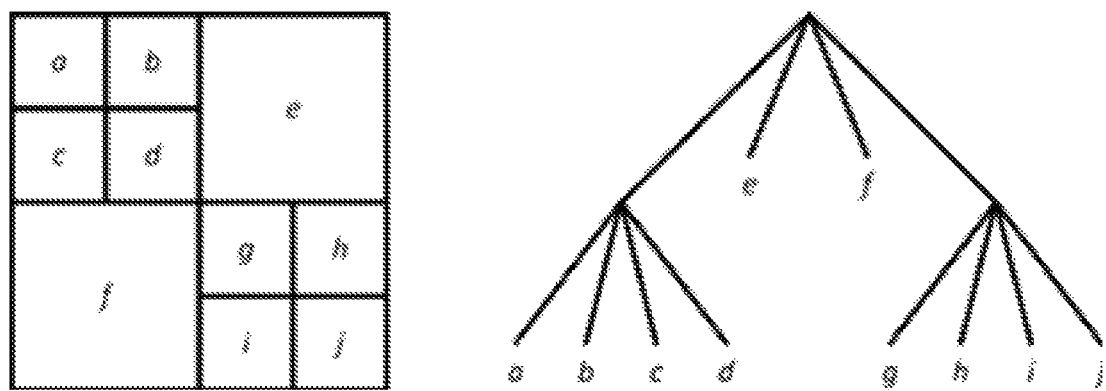
FIG. 2 is a conceptual diagram illustrating a transform scheme based on a residual quadtree, such as that used in High Efficiency Video Coding (HEVC).

FIG. 2 is a conceptual diagram illustrating a transform scheme based on a residual quadtree, such as that used in High Efficiency Video Coding (HEVC). FIG. 2 shows an example where a CU includes ten TUs, labeled with the letters a to j, and the corresponding block partitioning. Each node of the RQT is actually a TU. The individual TUs are processed in depth-first tree traversal order, which is illustrated in the figure as alphabetical order, which follows a recursive Z-scan with depth-first traversal. The quadtree approach enables the adaptation of the transform to the varying space-frequency characteristics of the residual signal. Typically, larger transform block sizes, which have larger spatial support, provide better frequency resolution. However, smaller transform block sizes, which have smaller spatial support, provide better spatial resolution. The trade-off between the two, spatial and frequency resolutions, may be chosen by the encoder mode decision, for example, based on rate-distortion optimization technique. The rate-distortion optimization technique calculates a weighted sum of coding bits and reconstruction distortion, i.e., the rate-distortion cost, for each coding mode (e.g., a specific RQT splitting structure), and selects the coding mode with least rate-distortion cost as the best mode.

In some examples, three parameters are defined in the RQT: (1) the maximum depth of the tree, (2) the minimum allowed transform size, and (3) the maximum allowed transform size. In HEVC, the minimum and maximum transform sizes can vary within the range from 4×4 to 32×32 samples, which correspond to the supported block transforms mentioned above. The maximum allowed depth of the RQT restricts the number of TUs. A maximum depth equal to 1 means that a CU cannot be split any further if each included TU reaches the maximum allowed transform size, e.g., 32×32.

All of these parameters may interact with and influence the RQT structure. For instance, consider a case in which the root CU size is 64×64, the maximum depth is equal to zero and the maximum transform size is equal to 32×32. In this case, the CU has to be partitioned at least once, since otherwise it would lead to a 64×64 TU, which is not allowed. The RQT parameters, i.e., maximum RQT depth, minimum and maximum transform size, may be transmitted in the bitstream at the sequence parameter set level. Regarding the RQT depth, different values can be specified and signaled for intra and inter coded CUs. For example, a first maximum depth value can be specified for CUs encoded in intra mode and a second, different maximum depth value can be specified for CUs encoded in inter mode.

The quadtree transform is applied for both Intra and Inter residual blocks. Typically, a DCT-II transform (i.e., a type-2 discrete cosine transform) of the same size of the current residual quadtree partition is applied for a residual block. However, if the current residual quadtree block is 4×4 and is generated by Intra prediction, a 4×4 DST-VII transform (i.e., a type-7 discrete sine transform) is applied. In HEVC, larger size transforms, e.g., 64×64 transforms, are not adopted mainly due to their limited benefit and relatively high complexity for relatively smaller resolution videos.

Figure 3:
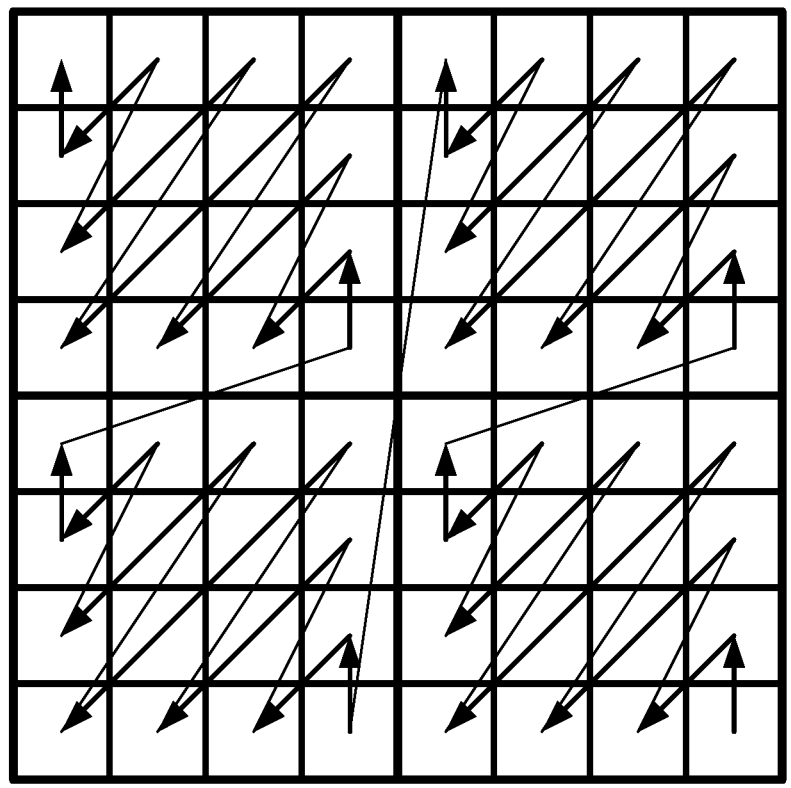
FIG. 3 is a conceptual diagram illustrating a coefficient scan based on coding groups, such as that used in HEVC.

In HEVC, regardless the TU size, the residual of a TU is coded with non-overlapped coefficient groups (CGs). Each of the CGs contains the coefficients of a 4×4 block of a TU. For example, a 32×32 TU has 64 CGs in total, and a 16×16 TU has 16 CGs in total. The CGs inside a TU are coded according to a certain pre-defined scan order. When coding each respective CG, the coefficients inside the respective CG are scanned and coded according to a certain pre-defined scan order for a 4×4 block. FIG. 3 illustrates the coefficient scan for an 8×8 TU containing 4 CGs used in HEVC.

The syntax element table used in HEVC for signaling residual data of a TU is defined as follows:

| 7.3.8.11 Residual coding syntax | |
|---|---|
| | Descriptor |
| residual_coding( x0, y0, log2TrafoSize, cIdx ) { | |
|     if( transform_skip_enabled_flag && !cu_transquant_bypass_flag && | |
|       ( log2TrafoSize = = 2 ) ) | |
|       transform_skip_flag[ x0 ][ y0 ][ cIdx ] | ae(v) |
|     last_sig_coeff_x_prefix | ae(v) |
|     last_sig_coeff_y_prefix | ae(v) |
|     if( last_sig_coeff_x_prefix > 3 ) | |
|       last_sig_coeff_x_suffix | ae(v) |
|     if( last_sig_coeff_y_prefix > 3 ) | |

-continued

| 7.3.8.11 Residual coding syntax | |
|---|---|
| | Descriptor |

```
        last_sig_coeff_y_suffix                                            ae(v)
    lastScanPos = 16
    lastSubBlock = ( 1 << ( log2TrafoSize − 2 ) ) * ( 1 << ( log2TrafoSize − 2
                                ) ) − 1
    do {
        if( lastScanPos = = 0 ) {
            lastScanPos = 16
            lastSubBlock− −
        }
        lastScanPos− −
        xS = ScanOrder[ log2TrafoSize − 2 ][ scanIdx ][ lastSubBlock ][ 0 ]
        yS = ScanOrder[ log2TrafoSize − 2 ][ scanIdx ][ lastSubBlock ][ 1 ]
        xC = ( xS << 2 ) + ScanOrder[ 2 ][ scanIdx ][ lastScanPos ][ 0 ]
        yC = ( yS << 2 ) + ScanOrder[ 2 ][ scanIdx ][ lastScanPos ][ 1 ]
    } while( ( xC != LastSignificantCoeffX ) | | ( yC != LastSignificantCoeffY
                                ) )
    for( i = lastSubBlock; i >= 0; i− − ) {
        xS = ScanOrder[ log2TrafoSize − 2 ][ scanIdx ][ i ][ 0 ]
        yS = ScanOrder[ log2TrafoSize − 2 ][ scanIdx ][ i ][ 1 ]
        inferSbDcSigCoeffFlag = 0
        if( ( i < lastSubBlock ) && ( i > 0 ) ) {
            coded_sub_block_flag[ xS ][ yS ]                               ae(v)
            inferSbDcSigCoeffFlag = 1
        }
        for( n = ( i = = lastSubBlock ) ? lastScanPos − 1 : 15; n >= 0; n− − ) {
            xC = ( xS << 2 ) + ScanOrder[ 2 ][ scanIdx ][ n ][ 0 ]
            yC = ( yS << 2 ) + ScanOrder[ 2 ][ scanIdx ][ n ][ 1 ]
            if( coded_sub_block_flag[ xS ][ yS ] && ( n > 0 | |
!inferSbDcSigCoeffFlag ) ) {
                sig_coeff_flag[ xC ][ yC ]                                 ae(v)
                if( sig_coeff_flag[ xC ][ yC ] )
                    inferSbDcSigCoeffFlag = 0
            }
        }
        firstSigScanPos = 16
        lastSigScanPos = −1
        numGreater1Flag = 0
        lastGreater1ScanPos = −1
        for( n = 15; n >= 0; n− − ) {
            xC = ( xS << 2 ) + ScanOrder[ 2 ][ scanIdx ][ n ][ 0 ]
            yC = ( yS << 2 ) + ScanOrder[ 2 ][ scanIdx ][ n ][ 1 ]
            if( sig_coeff_flag[ xC ][ yC ] ) {
                if( numGreater1Flag < 8 ) {
                    coeff_abs_level_greater1_flag[ n ]                     ae(v)
                    numGreater1Flag++
                    if( coeff_abs_level_greater1_flag[ n ] && lastGreater1ScanPos
= = −1 )
                        lastGreater1ScanPos = n
                }
                if( lastSigScanPos = = −1 )
                    lastSigScanPos = n
                firstSigScanPos = n
            }
        }
        signHidden = ( lastSigScanPos − firstSigScanPos > 3 &&
!cu_transquant_bypass_flag )
        if( lastGreater1ScanPos != −1 )
            coeff_abs_level_greater2_flag[ lastGreater1ScanPos ]           ae(v)
        for( n = 15; n >= 0; n− − ) {
            xC = ( xS << 2 ) + ScanOrder[ 2 ][ scanIdx ][ n ][ 0 ]
            yC = ( yS << 2 ) + ScanOrder[ 2 ][ scanIdx ][ n ][ 1 ]
            if( sig_coeff_flag[ xC ][ yC ] &&
                ( !sign_data_hiding_enabled_flag | | !signHidden | | ( n !=
firstSigScanPos ) ) )
                coeff_sign_flag[ n ]                                       ae(v)
        }
        numSigCoeff = 0
        sumAbsLevel = 0
        for( n = 15; n >= 0; n− − ) {
            xC = ( xS << 2 ) + ScanOrder[ 2 ][ scanIdx ][ n ][ 0 ]
            yC = ( yS << 2 ) + ScanOrder[ 2 ][ scanIdx ][ n ][ 1 ]
            if( sig_coeff_flag[ xC ][ yC ] ) {
                baseLevel = 1 + coeff_abs_level_greater1_flag[ n ] +
                            coeff_abs_level_greater2_flag[ n ]
                if( baseLevel = = ( ( numSigCoeff < 8 ) ?
```

| 7.3.8.11 Residual coding syntax | |
|---|---|
| | Descriptor |
|           ( ( n = = lastGreater1ScanPos) ? 3 : 2 ) : 1 ) ) <br>        coeff_abs_level_remaining[ n ] <br>        TransCoeffLevel[ x0 ][ y0 ][ cIdx ][ xC ][ yC ] = <br>           ( coeff_abs_level_remaining[ n ] + baseLevel ) * ( 1 − 2 * coeff_sign_flag[ n ] ) <br>        if( sign_data_hiding_enabled_flag && signHidden ) { <br>           sumAbsLevel += ( coeff_abs_level_remaining[ n ] + baseLevel ) <br>           if( ( n = = firstSigScanPos ) && ( ( sumAbsLevel % 2 ) = = 1 ) ) <br>              TransCoeffLevel[ x0 ][ y0 ][ cIdx ][ xC ][ yC ] = <br>                 −TransCoeffLevel[ x0 ][ y0 ][ cIdx ][ xC ][ yC ] <br>        } <br>        numSigCoeff++ <br>     } <br>   } <br> } <br> } | ae(v) |

For each respective color component (e.g., luma, Cb, Cr), a respective flag may be firstly signaled to indicate whether a current TU has at least one non-zero coefficient. If there is at least one non-zero coefficient, the position of the last significant coefficient in the coefficient scan order in the TU is then explicitly coded with a coordinate relative to the top-left corner of the TU. The vertical or horizontal component of the coordinate is represented by its prefix and suffix. The prefix is binarized with 0-th order truncated Rice (TR) and the suffix is binarized with fixed length. The discussion of Rice coding above is an instance of truncated Rice (TR) coding.

In the table above, last_sig_coeff_x_prefix specifies the prefix of the column position of the last significant coefficient in scanning order within a transform block. The values of last_sig_coeff_x_prefix shall be in the range of 0 to (log 2TrafoSize<<1)−1, inclusive.

In the table above, last_sig_coeff_y_prefix specifies the prefix of the row position of the last significant coefficient in scanning order within a transform block. The values of last_sig_coeff_y_prefix shall be in the range of 0 to (log 2TrafoSize<<1)−1, inclusive.

In the table above, last_sig_coeff_x_suffix specifies the suffix of the column position of the last significant coefficient in scanning order within a transform block. The values of last_sig_coeff_x_suffix shall be in the range of 0 to (1−((last_sig_coeff_x_prefix>>1)−1))−1, inclusive.
The column position of the last significant coefficient in scanning order within a transform block LastSignificantCoeffX is derived as follows:

If last_sig_coeff_x_suffix is not present, the following applies:

$$LastSignificantCoeffX = last\_sig\_coeff\_x\_prefix$$

Otherwise (last_sig_coeff_x_suffix is present), the following applies:

$$LastSignificantCoeffX = (1 << ((last\_sig\_coeff\_x\_prefix >> 1) - 1)) * (2 + (last\_sig\_coeff\_x\_prefix \& 1)) + last\_sig\_coeff\_x\_suffix$$

In the table above, last_sig_coeff_y_suffix specifies the suffix of the row position of the last significant coefficient in scanning order within a transform block. The values of last_sig_coeff_y_suffix shall be in the range of 0 to (1−((last_sig_coeff_y_prefix>>1)−1))−1, inclusive.

The row position of the last significant coefficient in scanning order within a transform block LastSignificantCoeffY is derived as follows:

If last_sig_coeff_y_suffix is not present, the following applies:

$$LastSignificantCoeffY = last\_sig\_coeff\_y\_prefix$$

Otherwise (last_sig_coeff_y_suffix is present), the following applies:

$$LastSignificantCoeffY = (1 << ((last\_sig\_coeff\_y\_prefix >> 1) - 1)) * (2 + (last\_sig\_coeff\_y\_prefix \& 1)) + last\_sig\_coeff\_y\_suffix$$

When scanIdx is equal to 2, the coordinates are swapped as follows: (LastSignificantCoeffX, LastSignificantCoeffY)=Swap(LastSignificantCoeffX, LastSignificantCoeffY).

With such a position coded and also the coefficient scanning order of the CGs, one flag is further signaled for CGs except the last CG (in scanning order) which indicates whether the last CG contains non-zero coefficients.

When coding whether one CG has non-zero coefficients, i.e., the CG flag (coded_sub_block_flag in the HEVC specification), a video coder may use the information of neighboring CGs to build the context. For example, in HEVC, the context selection for coding the CG flag is defined as:

(Right CG available && Flag of Right CG is equal to 1)||(Below CG available && Flag of Below CG is equal to 1)

In the formula above, Right CG and Below CG are the two neighboring CGs close to the current CG. For example, in FIG. 3, when coding the top-left 4×4 block, the Right CG is defined as the top-right 4×4 block and the Below CG is defined as the left-below 4×4 block. Chroma and luma use different sets of context models but a video coder may use the same rule to select one of the context models for each of chroma and luma. Details of the derivation of context index increment (ctxInc) may be found in subclause 9.3.4.2.4 of the HEVC specification.

For those CGs that contain non-zero coefficients, a video coder may further code significant flags (significant_flag or sig_coeff_flag), absolute values of coefficients (including coeff_abs_level_greater1_flag, coeff_abs_level_greater2_flag and coeff_abs_level_remaining) and sign information (coeff_sign_flag) for each coefficient according to the pre-defined 4×4 coefficient scan order. The coding of transform coefficient levels is separated into multiple scan passes.

In the first pass of the first bin coding, all of the first bins (or the bin index 0, bin0, which may correspond to significant_flag syntax elements) of transform coefficients at each position within one CG are coded except that it could be derived that the specific transform coefficient is equal to 0. For example, for the last CG that contains the coefficient at the last position, all the coefficients which are scanned before the last position in decoding order are derived to be 0 and no bins are coded.

As described in sub-clause 9.3.4.2.5 of the HEVC specification, a variable sigCtx is used to derive the value of a context index increment variable (ctxInc) used in selecting the coding context for a significant_flag. The variable sigCtx depends on the current location relative to the top-left position of the current TU, the color component index cIdx, the transform block size, and previously decoded bins of the syntax element coded_sub_block_flag. Different rules are applied depending on the TU size. Sub-clause 9.3.4.2.5 of the HEVC specification provides details of the selection of the context index increment for the significant flag.

In the second pass of the second bin coding, a video coder codes coeff_abs_level_greater1_flags. The context modeling for coeff_abs_level_greater1_flags is dependent on a color component index, a current sub-block scan index, and a current coefficient scan index within the current sub-block. Sub-clause 9.3.4.2.6 of the HEVC specification provides details of the selection of the context index increment variable for coeff_abs_level_greater1_flags.

In the third pass of the third bin coding, the video coder codes coeff_abs_level_greater2_flags. The context modeling for coeff_abs_level_greater2_flags is similar to that used by coeff_abs_level_greater1_flags. Sub-clause 9.3.4.2.7 of the HEVC specification provides details of the selection of the context index increment.

To improve throughput, the second and third passes may not process all of the coefficients in a CG. Rather, the first eight coeff_abs_level_greater1_flags in a CG are coded in regular mode. After that, the values are left to be coded in bypass mode in the fifth pass by the syntax coeff_abs_level_remaining. Similarly, only the coeff_abs_level_greater2_flag for the first coefficient in a CG with magnitude larger than 1 is coded. The rest of coefficients with magnitude larger than 1 of the CG use coeff_abs_level_remaining to code the value. This technique may limit the number of regular bins for coefficient levels to a maximum of 9 per CG: 8 for the coeff_abs_level_greater1_flags and 1 for coeff_abs_level_greater2_flags.

The fourth pass is for sign information. In HEVC, the sign of each non-zero coefficient is coded in the fourth scan pass in bypass mode. For each CG, and depending on a criterion, encoding the sign of the last nonzero coefficient (in reverse scan order) is simply omitted when using sign data hiding (SDH). Instead, the sign value is embedded in the parity of the sum of the levels of the CG using a predefined convention: even corresponds to "+" and odd to "−." The criterion to use SDH is the distance in scan order between the first and the last nonzero coefficients of the CG. Particularly, in HEVC, if this distance is equal or larger than 4, SDH is used. Otherwise, SDH is not used. The value of 4 was chosen in HEVC because the value of 4 provides the largest gain on HEVC test sequences.

In the last pass, remaining bins are coded in a further scan pass. Let the baseLevel of a coefficient be defined as:

$$baseLevel = significant\_flag + coeff\_abs\_level\_greater1\_flag + coeff\_abs\_level\_greater2\_flag \quad (1)$$

where a flag (i.e., significant_flag, coeff_abs_level_greater1_flag, and coeff_abs_level_greater2_flag) has a value of 0 or 1 and is inferred to be 0 if not present. Then, the absolute value of the coefficient is simply defined as:

$$absCoeffLevel = baseLevel + coeff\_abs\_level\_remaining. \quad (2)$$

In HEVC, coeff_abs_level_remaining is bypass coded, and hence no context modeling is needed.

The syntax element coeff_abs_level_remaining in HEVC indicates the remaining value for the absolute value of a coefficient level (if the value is larger than that coded in previous scan passes for coefficient coding). The syntax element coeff_abs_level_remaining is coded in bypass mode in order to increase the throughput. As described in Chien et al., "On Coefficient Level Remaining Coding", JCTVC-I0487, 9th Joint Collaborative Team on Video Coding (JCT-VC) Meeting, Geneva, Switzerland, April-May 2012, HEVC employs Rice codes for small values of coeff_abs_level_remaining and switches to an Exp-Golomb code for larger values of coeff_abs_level_remaining.

The point at which HEVC switches from using Rice codes for coeff_abs_level_remaining syntax elements to using Exp-Golomb codes for coeff_abs_level_remaining syntax elements may be referred to as a switch point. The switch point can be defined as one of the two methods below:
1) the switch point is equal to (3<<K): when coeff_abs_level_remaining is less than (3<<K), a K-th order Rice code is used. Otherwise, a prefix (with three '1's) and a suffix using a K-th order Exp-Golomb code is used for bypass coding
2) the switch point is equal to (4<<K): when coeff_abs_level_remaining is less than (4<<K), a K-th order Rice code is used. Otherwise, a prefix (with four '1's) and a suffix using a (K+1)-th order Exp-Golomb code is used for bypass coding.

For simplicity, in the descriptions below, the first method is used, i.e., the switch point is defined as (3<<K). An example is given in Table 4:

TABLE 4

| Codeword of coeff_abs_level_remaining equal to m | | | | | |
|---|---|---|---|---|---|
| Value | k = 0 | | Value | k = 1 | |
| m | Prefix | Suffix | m | Prefix | Suffix |
| 0 | 0 | | 0-1 | 0X | |
| 1 | 10 | | 2-3 | 10X | |
| 2 | 110 | | 4-5 | 110X | |
| 3 | 111 | 0 | 6-7 | 111 | 0X |
| 4-5 | 111 | 10X | 8-11 | 111 | 10XX |
| 6-9 | 111 | 110XX | 12-19 | 111 | 110XXX |
| 10-17 | 111 | 1110XXX | 20-35 | 111 | 1110XXXX |
| ... | ... | ... | ... | ... | ... |

As described in J. Sole et al, "Transform Coefficient Coding in HEVC," IEEE Transactions on Circuits and Systems for Video Transmission (special issue on HEVC), December 2012), in HEVC, the Rice parameter K is set to 0 at the beginning of each CG (coefficient group, which is a 4×4 sub-block) and K is conditionally updated depending on the previous value of the parameter and the current absolute level as follows:

$$\text{If } absCoeffLevel > 3*2^K, \text{ then } K = \min(K+1, 4) \qquad (3)$$

$$\text{Otherwise,} \qquad K = K$$

where K is the Rice parameter and function min( ) returns the smaller value between two inputs. Thus, if the absCoeffLevel value for a current coefficient level is greater than $3*2^K$, a video coder updates K to be equal to whichever is the lesser of K+1 and 4. If the absCoeffLevel value of the current coefficient level is not greater than $3*2^K$, the video coder does not update K. The parameter update process allows the binarization to adapt to the coefficient statistics when large values are observed in the distribution. In the following descriptions, such a method of deriving a Rice parameter is named the 'Lookback-based derivation method'.

Another technique, proposed in Karczewicz et al, "RCE2: Results of Test 1 on Rice Parameter Initialization", JCTVC-P0199, joint Collaborative Team on Video Coding (JCT-VC) of ITU-T SG 16 WP 3 and ISO/IEC JTC 1/SC 29/WG 11, 16th Meeting: San Jose, US, 9-17 Jan. 2014 (hereinafter, "JCTVC-P0199"), is employed for the Rice parameter derivation in HEVC Range Extensions to more efficiently code the much larger coefficient levels that may be present in lossless or high bit-depth coding.

Firstly, in the technique used in HEVC Range Extensions, 4×4 sub-blocks (i.e., CGs) are divided into different categories ("sbType"). For each sub-block, an initial Rice parameter is derived based on previously coded sub-blocks in the same category. The categorization is based on whether the sub-block (i.e., CG) is a transform-skip block ("isTSFlag") and whether the block is for the luma component:

$$\text{sbType}=\text{isLuma}*2+\text{isTSFlag} \qquad (4)$$

A video coder maintains stats statCoeff for each sub-block type (sbType) depending on coeff_abs_level_remaining of the first coefficient in the sub-block:

$$\text{if } (absCoeffLevel >= 3*(1<<(statCoeff/4))) \quad statCoeff++; \qquad (5)$$

$$\text{else if } ((2*absCoeffLevel) < (1<<(statCoeff/4))) \quad statCoeff--;$$

The video coder updates the statCoeff variable is updated at most once per 4×4 sub-block using the value of the first coded coeff_abs_level_remaining of the sub-block. The video coder resets the entries of statCoeff to 0 at the beginning of the slice. Furthermore, the video coder uses the value of statCoeff to initialize the Rice parameter K at the beginning of each 4×4 sub-block as:

$$cRiceParam=Min(maxRicePara, statCoeff/4). \qquad (6)$$

In the following descriptions, such a method of deriving a Rice parameter (e.g., cRiceParam) is named "Statistics-based derivation method" or the "statistics-based Rice parameter derivation method." Thus, in the statistics-based derivation method, a video coder may divide the plurality of sub-blocks of a current picture into a plurality of categories such that, for respective sub-blocks of the plurality of sub-blocks, the respective sub-block is categorized based on whether the respective sub-block is a transform-skip block and whether the respective sub-block is for a luma component. Furthermore, for each respective category of the plurality of categories, the video coder may maintain a respective statistic value for the respective category. For each respective sub-block of the plurality of sub-blocks, the video coder may use the respective statistic value for the category to which the respective sub-block belongs to initialize a respective Rice parameter for the respective sub-block. A coeff_abs_level_remaining syntax element in a particular sub-block of the plurality of sub-blocks is binarized using a K-th order Rice code, K being the Rice parameter for the particular sub-block.

For each respective category of the plurality of categories, as part of maintaining the respective statistic value for the respective category, the video coder may, for each respective sub-block of the picture that belongs to the respective category, update the respective statistic value for the respective category at most once for the respective sub-block using a level remaining syntax element coded first for the respective sub-block. Furthermore, as part of updating the respective statistic value for the respective category, the video coder may increment the respective statistic value for the respective category if (absCoeffLevel>=3*(1<<(statCoeff/4))); and decrement the respective statistic value for the respective category if ((2*absCoeffLevel)<(1<<(statCoeff/4))). As before, absCoeffLevel is an absolute coefficient level of the respective sub-block and statCoeff is the respective statistic value for the respective category. For each respective sub-block of the plurality of sub-blocks, as part of using the respective statistic value for the category to which the respective sub-block belongs to initialize a respective Rice parameter for the respective sub-block, the video coder may determine the respective Rice parameter for the respective sub-block as a minimum of a maximum Rice parameter and the respective statistic value for the category to which the respective sub-block belongs divided by 4.

Nguyen et al., "Non-CE11: Proposed Cleanup for Transform Coefficient Coding", JCTVC-H0228, 8th Meeting: San Jose, Calif., USA, 1-10 Feb. 2012 (hereinafter, "JCTVC-H0228") proposed one-scan pass coding, i.e., all information on a transform coefficient level is coded in a single step instead of multiple pass coding as in HEVC. For each scan position, neighbors (i.e., neighboring samples) covered by a local template are evaluated, as done for bin0 (the first bin of the bin string, also referred as significant_coeff_flag or coeff_abs_greater0_flag) in the current design of HEVC. From this evaluation, context models and the Rice parameter, which controls the adaptive binarization of the remaining absolute value, are derived. To be more specific, the context models for the bin0, bin1, bin2 and the Rice parameters are all selected (bin1 and bin2 are also referred as coeff_abs_greater1_flag and coeff_abs_greater2_flag) based on the transform coefficient magnitudes located in the local template.

Figure 4:
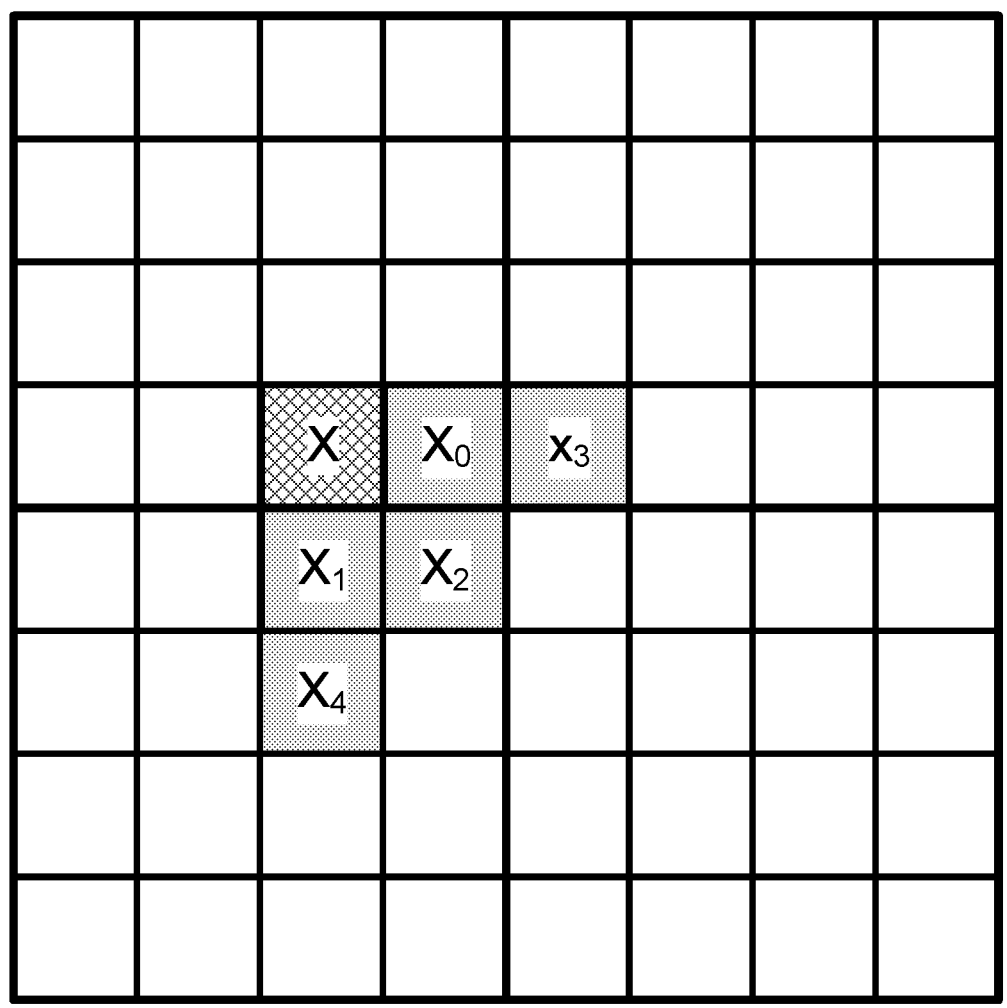
FIG. 4 is a conceptual diagram illustrating an example local template.

FIG. 4 is a conceptual diagram illustrating an example local template. Particularly, an example for a local template is given in FIG. 4 for an 8×8 transform block with diagonal scan, x denotes the current scan position and $x_i$ with $i \in [0,4]$ denotes the neighbors covered by the local template.

In the following equations, sum_absolute_level, which indicates the absolute sum of the neighbors, and sum_absolute_levelMinus1, which indicates the absolute sum of each level minus 1, are used to derive context indices for bin0, bin1, bin2 (i.e., for a significant_flag, coeff_abs_greater1_flag, and coeff_abs_greater2_flag), and to determine the Rice parameter r.

$$\text{sum\_absolute\_level} = \sum |x_i| \qquad (7)$$

-continued $$\text{sum\_absolute\_levelMinus1} = \sum \delta_j(x_i)$$

$$\text{with } \delta_j(x) = \begin{cases} |x_i| - 1 & |x_i| > 0 \\ 0 & x_i = 0 \end{cases}$$

In the technique described in JCTVC-H0228, the Rice parameter r is derived as follows. For each scan position, the parameter is set to 0. Then, the sum_absolute_levelMinus1 is compared against a threshold set $t_R=\{3, 9, 21\}$. In other words, the Rice parameter is 0 if the sum_absolute_levelMinus1 falls into the first interval, is 1 if sum_absolute_levelMinus1 falls into the second interval and so on. The derivation of the Rice parameter r is summarized in the following.

$$r(x) = \begin{cases} 0 & x \in [0, 3] \\ 1 & x \in [4, 9] \\ 2 & x \in [10, 21] \\ 3 & x > 21 \end{cases} \quad (8)$$

with x equal to sum_absolute_levelMinus1. The range of Rice parameter is within [0, 3].

In the following descriptions, such a method of deriving Rice parameter is named "Template-based derivation method" or "Template-based Rice parameter derivation method." Thus, in the template-based derivation method, a current picture comprises a plurality of 4×4 sub-blocks, a local template covers neighbors of a current sample of the TU, and the current sample is at a current scan position. Furthermore, video encoder 20 may signal and video decoder 30 may obtain a syntax element (e.g., a coeff_abs_level_remaining syntax element) indicating a respective remaining value for an absolute value of a respective coefficient level for the current sample. In the template-based derivation method, for each respective neighbor covered by the local template, a video coder (e.g., video encoder 20 or video decoder 30) may determine a respective value for the respective neighbor. In this example, the respective value for the respective neighboring is equal to the absolute value of the neighbor minus 1 if the absolute value of the neighbor is greater than 0 and equal to 0 if the neighbor is equal to 0. Additionally, in the template-based derivation method, the video coder may determine a sum value (e.g., sum_absolute_levelMinus1) equal to a sum of values for the neighbors. Furthermore, in the template-based derivation method, the video coder may determine a Rice parameter is equal to 0 if the sum value falls into a first interval (e.g., x is an integer between 0 and 3, inclusive), equal to 1 if the sum value falls into a second interval (e.g., x is an integer between 4 and 9, inclusive), equal to 2 if the sum value falls into a third interval (e.g., x is an integer between 10 and 21, inclusive), and equal to 3 if the sum value falls into a fourth interval (e.g., x>21). The syntax element is binarized using a K-th order Rice code, where K is equal to the determined Rice parameter. Intervals other than those provided in the above example may also be used. The intervals may be non-overlapping.

Current Rice parameter derivation methods have at least the following drawbacks. First, in the design in HEVC, only one previous coded coefficient level is taken into consideration, which may be sub-optimal. In addition, within one CG, the Rice parameter keeps unchanged or going up, wherein in a local area, smaller coefficient levels may be observed which prefers smaller Rice parameters for less coded bins. For example, since K is set to 0 at the beginning of each CG, and provided that K is less than 4, K is incremented when the absCoeffLevel of a coefficient is greater than $3*2^K$ or kept at the same value otherwise. However, in this example, the design of HEVC does not permit K to be decremented, even if doing so would yield better compression.

Second, although the initialization method employed in HEVC Range Extensions (see JCTVC-P0199) is very beneficial for lossless or high bit-depth coding, it still has some drawbacks. For example, within one CG, the Rice parameter stay unchanged, smaller coefficient levels may be observed which prefers smaller Rice parameters for less coded bins. For instance, in the technique in HEVC Range Extensions, the Rice parameter is determined based on a statCoeff value, which is updated at most once per 4×4 sub-block. In lossless coding, quantization may be skipped. In lossy coding, quantization may be performed and, as a result, information of the original video data is lost.

Third, the design in JCTVC-H0228 is more efficient for lossy coding by taking multiple neighbors into consideration. However, the correlation among different TUs is not utilized, as HEVC Range Extensions does. Furthermore, as noted in equation (8), above, the maximum Rice parameter produced in JCTVC-H0228 is equal to 3. Prediction errors (i.e., values of residual samples) may be quite large for lossless coding or high bit-depth coding. In this case, the maximum Rice parameter as set in JCTVC-H0228 equal to 3 might not be sufficiently efficient. Additionally, how to set the Rice parameter based on sum_absolute_levelMinus1 is unknown.

In order to solve some or all of the problems mentioned above, the following techniques for Rice parameter derivation and potentially more efficient transform coefficient context modeling are proposed. The following itemized methods may be applied individually. Alternatively, any combination of them may be applied. The techniques described in this disclosure may also be used jointly with the techniques proposed in U.S. Provisional Patent Application 62/168,571, filed May 29, 2015, U.S. patent application Ser. No. 15/166,153, filed May 26, 2016, and PCT application PCT/US2016/034828, filed May 27, 2016.

In accordance with an example technique of this disclosure, the statistics-based and template-based parameter derivation methods may be used separately for encoding/decoding coefficient levels in one TU. For instance, in accordance with this technique, a video coder may use a first Rice parameter derivation method and a second Rice parameter derivation method for decoding coefficient levels of a single TU of a current CU of a picture. In this example, the first Rice parameter derivation method is a statistics-based derivation method. Furthermore, in this example, the second Rice parameter derivation method is a template-based derivation method.

More specifically, in one example, the statistics-based method is applied to the first coeff_abs_level_remaining syntax element in decoding/parsing order in each TU at the decoder side while for other coeff_abs_level_remaining syntax elements, the template-based derivation method is applied. For instance, a video coder may update the value of statCoeff as described above for 4×4 sub-blocks based on the value of the first coded coeff_abs_level_remaining syntax element of the sub-blocks. Furthermore, in this example, the video coder may initialize a Rice parameter based on the value of statCoeff. The video coder may then use this Rice parameter in coding the first coeff_abs_level_remaining syntax element of a TU. Additionally, in this example, the video coder may perform the template-based derivation method as described above for each coeff_abs_level_remaining syntax element of the TU other than the first coeff_abs_level_remaining syntax element of the TU.

Alternatively, in some examples, the statistics-based method is applied to the first few coeff_abs_level_remaining syntax elements in encoding/decoding order in each TU while for other coeff_abs_level_remaining syntax elements, the template-based derivation method is applied. Thus, in some examples, video encoder 20 may signal and video decoder 30 may obtain a series of syntax elements (e.g., coeff_abs_level_remaining syntax elements), each respective syntax element of the series of syntax elements indicating a respective remaining value for an absolute value of a respective coefficient level of the TU. In such examples, as part of a video coder (e.g., video encoder 20 or video decoder 30) using the first Rice parameter derivation method (e.g., the statistics-based derivation method) and the second Rice parameter derivation method (e.g., the template-based derivation method) for decoding coefficient levels of the TU, the video coder may apply the first Rice parameter derivation method to a syntax element occurring first in the TU in a decoding or parsing order, where the syntax element is in the series of syntax elements. Additionally, in this example, the video coder may apply the second Rice parameter derivation method to each other syntax element of the series of syntax elements.

Alternatively, in some examples, the statistics-based derivation method is applied to one or more coeff_abs_level_remaining syntax elements for coefficients located at specific relative positions in each TU while for other coeff_abs_level_remaining syntax elements, the template-based derivation method is applied. For example, the video coder may use the statistics-based derivation method to determine Rice parameters for coding the coeff_abs_level_remaining syntax elements for the first, the 16-th, . . . and the 32-th coefficients of a TU, and use the template-based derivation method to derive Rice parameters for coding each other coeff_abs_level_remaining syntax element of the TU.

Alternatively, in some examples, the statistics-based method is applied to the first coeff_abs_level_remaining syntax element in decoding/parsing order in each Coefficient Group (CG) at the decoder side while for other coeff_abs_level_remaining syntax elements in the CG, the template-based derivation method is applied. For instance, a video coder (e.g., video encoder 20 or video decoder 30) may, for each 4×4 sub-block of a TU, use the statistics-based derivation method to determine Rice parameters for coding a coeff_abs_level_remaining syntax element for a coefficient occurring first in a parsing/decoding order used in decoding the respective sub-block. In this example, the video coder uses the template-based derivation method to derive a Rice parameter for coding a coeff_abs_level_remaining syntax element for each other coefficient of the TU.

Alternatively, in some examples, the statistics-based method is applied to the first few coeff_abs_level_remaining syntax elements in decoding/parsing order in each CG at the decoder side while for other coeff_abs_level_remaining in the CG, the template-based derivation method is applied. For instance, a video coder (e.g., video encoder 20 or video decoder 30) may, for each 4×4 sub-block of a TU, use the statistics-based derivation method to determine Rice parameters for coding a coeff_abs_level_remaining syntax element for a coefficient occurring, e.g., in the first two or three positions, in a parsing/decoding order used in decoding the respective sub-block. In this example, the video coder uses the template-based derivation method to derive a Rice parameter for coding a coeff_abs_level_remaining syntax element for each other coefficient of the TU.

In accordance with an example technique of this disclosure, the statistics-based and template-based Rice parameter derivation methods are used jointly for determining a Rice parameter for encoding/decoding one coefficient level. In this way, a video coder may use a first Rice parameter derivation method and a second Rice parameter derivation method jointly to code a single coefficient level of a transform unit, where the first Rice parameter derivation method is a statistics-based derivation method, and the second Rice parameter derivation method is a template-based derivation method.

Thus, in this example, a video coder may use a function to determine a Rice parameter value for decoding a coefficient level of a current coefficient of a TU. In this example, inputs of the function include a recorded value and a current derived Rice parameter value. The recorded value may be based on a Rice parameter value used to decode a coefficient previous to the current coefficient. In this example, the video coder may derive the current derived Rice parameter value using the template-based derivation method. Furthermore, in this example, the function may be a maximum function.

For instance, in one example, the Rice parameter used to encode/decode a current coeff_abs_level_remaining syntax element is determined using a function, with a recorded value based on the Rice parameter value used to encode/decode the previous coefficient and the current derived Rice parameter value using the template-based method as inputs. Examples of determining the recorded value are described below.

In one example where the Rice parameter used to code (i.e., encode or decode) a current coeff_abs_level_remaining syntax element is determined using a function, the function is a maximum function, e.g., the Rice parameter used to encode/decode the current coeff_abs_level_remaining syntax element is the maximum value between a recorded Rice parameter value and a current derived value using the template-based method. In one example, the Rice parameter actually used for encoding/decoding one coeff_abs_level_remaining syntax element is set to be the recorded value for encoding/decoding the next coeff_abs_level_remaining syntax element. Alternatively, in some examples, after encoding/decoding one coeff_abs_level_remaining syntax element, the recorded Rice parameter value for encoding/decoding the next coeff_abs_level_remaining syntax element is set equal to the actually used Rice parameter minus a variable Diff. In one such example, the variable Diff is set equal to 1. For instance, a video coder may set the recorded value equal to the determined Rice parameter value for decoding the coefficient level of the current coefficient, minus 1. Alternatively, the variable Diff is dependent on the input/coded internal bit-depth and/or coding mode. In some examples, the video coder may determine whether the recorded value is smaller than 0. Based on the recorded value being smaller than 0, the video coder may reset the recorded value to 0.

As described above, a recorded value may be used as the Rice parameter for coding a coeff_abs_level_remaining syntax element. In different examples, a video coder may determine the recorded value in different ways. For instance, in one example, at the beginning of decoding one transform unit or CG, the recorded Rice parameter value is set equal to 0. Alternatively, in some examples, the recorded Rice parameter value is set equal to the one derived based on the statistics-based method. In other words, a video coder may set the recorded Rice parameter value using the statistics-based method. Alternatively, in some examples, when decoding the first coeff_abs_level_remaining syntax element in a TU or CG, the Rice parameter derived based on the statistics-based method is directly used without considering the previous value of the Rice parameter. In other words, when decoding the coeff_abs_level_remaining syntax element occurring first in a TU (or, in some examples, additionally first in each CG of the TU), the video coder uses the Rice parameter derived based on the statistics-based method directly, without considering any previous value of the Rice parameter. Alternatively, in some examples, the 'Template-based method' may be replaced by the 'Lookback-based method' in the examples above.

In accordance with particular example techniques of this disclosure, in the template-based method, a generic function is proposed to derive the Rice parameter K from sum_absolute_levelMinus1. As indicated above, in the template-based method, the value sum_absolute_levelMinus1 may indicate a sum of values, each respective value being an absolute value of a non-zero level minus 1 of a respective coefficient covered by a local template for a current coefficient. Thus, in accordance with some such examples of this disclosure, a video coder may determine a value (e.g., sum_absolute_levelMinus1) equal to an absolute sum of each level of a plurality of levels minus 1, where each respective coefficient level of the plurality of levels is in a region defined by a template. In this example, the video coder may determine a Rice parameter based on a value and generate, based on the Rice parameter, a decoded value for a current coefficient of the TU.

For instance, in one example where a video coder uses a generic function to derive the Rice parameter from sum_absolute_levelMinus1, K is defined as the minimum integer that satisfies (1<<(K+3))>(sum_absolute_levelMinus1+M), wherein M is an integer, e.g., 4. Alternatively, in some examples, '>' is replaced by '>='. For example, let M be equal to 4 and let sum_absolute_levelMinus1 be equal to 5, thus (sum_absolute_levelMinus1+M) is equal to 9. In this example, if K is equal to 0, (1<<(K+3)) is equal to 8 and if K is equal to 1, (1<<(K+3)) is equal to 16. Hence, in this example, since K=1 is the minimum integer value that yields (1<<(K+3))>(sum_absolute_levelMinus1+M), the video coder sets K equal to 1.

In one example, K is defined as the minimum integer that satisfies (1<<(K+3))>(sum_absolute_levelMinus1+M+(1<<K)), wherein M is an integer, e.g., 4. Alternatively, in some examples, '>' is replaced by '>='. For example, let M be equal to 4 and let sum_absolute_levelMinus1 be equal to 5. In this example, if K is equal to 0, (1<<(K+3)) is equal to 8 and (sum_absolute_levelMinus1+M+(1<<K)) is equal to 10. Furthermore, in this example, if K is equal to 1, (1<<(K+3)) is equal to 16 and (sum_absolute_levelMinus1+M+(1<<K)) is equal to 11. Hence, in this example, since K=1 is the minimum integer value that yields (1<<(K+3))>(sum_absolute_levelMinus1+M+(1<<K)), the video coder sets K equal to 1.

Alternatively, in some examples where a video coder uses a generic function to derive the Rice parameter from sum_absolute_levelMinus1, the derived K may be capped to a threshold. For instance, the threshold may be 9, 10, or another value. In one example, the threshold may be predefined or signaled for one sequence (e.g., a coded video sequence) and/or for one picture and/or for one slice. For instance, in various examples, the threshold may be defined in a sequence parameter set, a picture parameter set, and/or a slice header. In another example, the threshold is dependent on the coding mode (lossless coding or lossy coding) and/or input/coded internal bit-depth. For example, the threshold may be greater in lossless coding than in lossy coding. Similarly, the threshold may be greater when coding coefficients with greater internal bit-depth.

In accordance with an example technique of this disclosure, in the template-based parameter derivation method, multiple templates (i.e., relative locations of neighbors for calculating sum_absolute_levelMinus1) are defined and utilized. In one example where multiple templates are defined and utilized, the selection of the template is based on a scan pattern. Thus, in accordance with this example, a video coder may select, from among a plurality of templates, a template to use in deriving a Rice parameter, each respective template of the plurality of templates indicating different locations of neighboring coefficients relative to a current coefficient. Furthermore, the video coder may use the Rice parameter to decode a code word for a value indicating an absolute level of a remaining value for the current coefficient.

In some examples where multiple templates are defined and utilized, the scan pattern may be the pattern used for scanning coefficients of a TU, such as the pattern shown in the example of FIG. 3. For instance, a video coder may select a first template (e.g., the template of FIG. 4) if a first scan pattern is used (e.g., the scan pattern of FIG. 3), but may select a second, different template if a second, different scan pattern is used. For instance, if the second scan pattern is the reverse of the scan pattern of FIG. 3, the second template may be similar to the template of FIG. 4, but flipped vertically and horizontally.

In some examples where multiple templates are defined and utilized, the selection of the template is based on intra prediction modes. For example, a video coder may select a first template for use in determining Rice parameters for coding coeff_abs_level_remaining syntax elements of coefficients of TUs of a CU if an intra prediction mode used for intra predicting a PU of the CU is horizontal or near-horizontal and may select a second, different template if the intra prediction mode is vertical or near-vertical.

In some examples where multiple templates are defined and utilized, the selection of the template is based on coding modes (e.g., intra or inter coded modes), and/or transform matrices. For example, a video coder may select a first template for use in determining Rice parameters for coding coeff_abs_level_remaining syntax elements of coefficients of TUs of a CU if the CU is coded using intra prediction and may select a second, different template if the CU is coded using inter prediction.

In some examples where multiple templates are defined and utilized, the selection of the template is based on a Quantization Parameter (QP) of the current TU. The QP may be a variable used by a decoding process for scaling of transform coefficient levels. For example, a video coder may select a first template for use in determining Rice parameters for coding coeff_abs_level_remaining syntax elements of coefficients of TUs of a CU if the QP is less than a threshold value and may select a second, different template if the QP is greater than the threshold value.

In another example, the selection of the template could be based on the location of a CG or location of the coefficient level relative to the TU and/or transform unit sizes. For example, a video coder may select a first template for use in determining Rice parameters for coding coeff_abs_level_remaining syntax elements of coefficients of a bottom row of CGs of a TU of a CU and may select a second, different template for each other CG of the TU.

As indicated above, in the lookback-based derivation method used in HEVC, if the absCoeffLevel value for a current coefficient level is greater than $3*2^K$, a video coder updates K to be equal to whichever is the lesser of K+1 and 4. If the absCoeffLevel value of the current coefficient level is not greater than $3*2^K$, the video coder does not update K. In accordance with an example technique of this disclosure, in the lookback-based derivation method, instead of using the absolute value (absCoeffLevel) to calculate the Rice parameter, the value of a coeff_abs_level_remaining syntax element to be coded is used (which is equal to (absCoeffLevel−baseLevel) as defined in equation (1)). Thus, in this example, if the value of the coeff_abs_level_remaining syntax element for a current coefficient level is greater than $3*2^K$, a video coder updates K to be equal to whichever is the lesser of K+1 and 4. If the absCoeffLevel value of the current coefficient level is not greater than $3*2^K$, the video coder does not update K. In this example, the video coder may then use the resulting value of K as the Rice parameter for coding the coeff_abs_level_remaining syntax element for the current coefficient level.

For example, a video coder may determine a level remaining value (e.g., coeff_abs_level_remaining) for a previous coefficient, the level remaining value being equal to a difference between a first value and a second value, the first value between an absolute value of the previous coefficient, the second value being equal to a sum of a first flag (e.g., significant_flag), a second flag (e.g., coeff_abs_level_greater1_flag), and a third flag (e.g., coeff_abs_level_greater2_flag). The first flag indicates whether the previous coefficient is non-zero, the second flag indicates whether the previous coefficient is greater than 1, and the third flag indicates whether the previous coefficient is greater than 2. In this example, the video coder may determine, based on the level remaining value for the previous coefficient, whether to modify a Rice parameter. Furthermore, in this example, the video coder may use the Rice parameter to decode a code word for an absolute level of a remaining value for a current coefficient.

As indicated above, in the statistics-based derivation method used in the HEVC Range Extensions, the statCoeff value is incremented if the absCoeffLevel of a current coefficient level is greater than or equal to (3*(1<<(statCoeff/4))) and decremented if ((2*absCoeffLevel)<(1<<(statCoeff/4))). In accordance with an example technique of this disclosure, in the statistics-based derivation method, instead of using the absolute value (absCoeffLevel) to update the stat statCoeff, a coeff_abs_level_remaining syntax element to be coded is used (which is equal to (absCoeffLevel-baseLevel) as defined in equation (1)). Thus, in this example, if the coeff_abs_level_remaining syntax element of a current coefficient level is greater than or equal to (3*(1<<(statCoeff/4))) and decremented if ((2*coeff_abs_level_remaining)<(1<<(statCoeff/4))). In this example, the video coder may set K equal to whichever is less of a maximum Rice parameter and (statCoeff/4). In this example, the video coder may then use K as the Rice parameter for coding the coeff_abs_level_remaining syntax element for the current coefficient level.

For instance, in accordance with this example, a video coder may determine a level remaining value (e.g., coeff_abs_level_remaining) for a previous coefficient, the level remaining value being equal to a difference between a first value and a second value, the first value between an absolute value (e.g., absCoeffLevel) of the previous coefficient, the second value (e.g., baseLevel) being equal to a sum of a first flag (e.g., significant_flag), a second flag (e.g., coeff_abs_level_greater1_flag), and a third flag (e.g., coeff_abs_level_greater2_flag). The first flag indicates whether the previous coefficient is non-zero, the second value indicates whether the previous coefficient is greater than 1, and the third flag indicates whether the previous coefficient is greater than 2. In this example, the video coder may update a statistic based on the level remaining value. Additionally, in this example, the video coder may determine, based on the statistic, a Rice parameter. Furthermore, in this example, the video coder may use the Rice parameter to decode a code word for an absolute level of a remaining value for a current coefficient.

In accordance with an example technique of this disclosure, in either of the three methods (i.e., template-based, lookback-based and statistics-based method) mentioned above, the switch point for Rice code and Rice code plus Exp-Golomb code may be set equal to (M<<K), wherein M is also dependent on K, but could be different for different K values. In one example, for K equal to 0, 1, 2, M is set to 6, 5, 6, respectively. In this example, for other K values, M is set to 3. In another example, when K is smaller than 3, M is set to 6 and for other K values, M is set to 3.

For instance, in this example, a video coder may determine a switch point as M<<K, where M is equal to 1<<K and K is a number of bits in a remainder portion of a codeword. In this example, the video coder may select, based on the switch point, either a Rice coding method or an Exp-Golomb coding method. Additionally, in this example, the video coder may use the selected coding method to decode a code word for an absolute level of a remaining value for a current coefficient.

In accordance with an example technique of this disclosure, the derivation method for a Rice parameter may be further dependent on the bit-depth of input video or internal codec bit-depth. In one example, when the bit-depth is equal to 8, the template-based method is applied, and when the bit-depth is larger than 8, e.g., 10 or 12, the statistic-based method is applied.

Thus, in accordance with such an example, a video coder may determine a Rice parameter based on a bit depth of input video or based on an internal codec bit depth. In this example, the video coder may use the Rice parameter to decode a code word for an absolute level of a remaining value for a current coefficient.

In accordance with an example technique of this disclosure, lossy or lossless coding may use different methods to derive the Rice parameter. For example, a video coder may use a template-based derivation method if a block is encoded using lossy coding and may use a statistics-based derivation method if the block is encoded using lossless coding. In another example, a video coder may use a statistics-based derivation method if a block is encoded using lossy coding and may use a template-based derivation method if the block is encoded using lossless coding.

Thus, in accordance with such an example, a video coder may derive a Rice parameter using different methods depending on whether lossy or lossless coding is used. Furthermore, in this example, the video coder may use the Rice parameter to decode a code word for an absolute level of a remaining value for a current coefficient.

Alternatively, in some examples, different methods to derive the Rice parameter may be applied according the Quantization Parameter (QP) value of the current TU. For example, a video coder may use a template-based derivation method if the QP value of the current TU is greater than a threshold and may use a statistics-based derivation method if the QP value of the current TU is less than the threshold.

In another example, a video coder may use a statistics-based derivation method if the QP value of the current CU is greater than a threshold and may use a template-based derivation method if the QP value of the current CU is less than the threshold.

As indicated above, in some examples, a video coder uses Rice codes for coeff_abs_level_remaining syntax elements having smaller values and uses Exp-Golomb codes for coeff_abs_level_remaining syntax elements having greater values. both Rice codes and Exp-Golomb codes are determined using a parameter K. In accordance with an example technique of this disclosure, the above methods may be used to determine the orders of both Rice code and the Exp-Golomb code. For instance, a video coder may use any of the examples provided above for determining the value K for use in coding a coeff_abs_level_remaining syntax element for a particular coefficient level and use the determined value of K for either determining a K-th order Rice code or a K-th order Exp-Golomb code for the coeff_abs_level_remaining syntax element for the particular coefficient level. Alternatively, in some examples, the methods described in this disclosure are only used to determine the order of Rice code or Exp-Golomb code. In other words, in such examples, a video coder may use the examples provided in this disclosure for determining a value of the parameter K only for determining K-th order Rice codes; or the video coder may use the examples provided in this disclosure for determining a value of the parameter K only for determining K-th order Exp-Golomg codes.

In accordance with an example technique of this disclosure, alternatively, in some examples, the above methods may be applied to other kinds of binarization methods for coding the coefficient levels which requires the determination of an order, such as K-th order EG code.

In accordance with an example technique of this disclosure, alternatively, the above methods may also be applied to other syntax elements for which a K-th order binarization method is applied, with or without changing the template. In one example, the coding of motion vector differences may use the above methods. An inter-coded block is encoded according to a motion vector that points to a block of reference samples forming the predictive block, and the residual data indicates the difference between the coded block and the predictive block. Rather than signaling the motion vector directly, a video encoder may identify a set of motion vector candidates, which may specify motion parameters of a spatial or temporal neighbor of the block. The video encoder may signal an index of a selected motion vector candidate in the set of motion vector candidates and signal a difference between the motion vector of the selected motion vector candidate and the motion vector of the block. The signaled difference may be referred to as a "motion vector difference" (MVD). Similar to the approach in HEVC for signaling coefficient levels, an MVD may be signaled in HEVC using, for each of a horizontal dimension x and a vertical dimension y, an abs_mvd_greater0_flag syntax element, an abs_mvd_greater1 flag syntax element, an abs_mvd_minus2 syntax element, and a mvd_sign_flag syntax element. As indicated in sub-clause 7.4.9.9 of the HEVC specification, abs_mvd_minus2[compIdx] plus 2 specifies the absolute value of a motion vector component difference. Table 9-38 of the HEVC specification indicates that abs_mvd_minus2 is binarized using a $1^{st}$ order Exp-Golomb code. However, in accordance with an example of this disclosure, the order K of a Rice of Exp-Golomb code used to binarize an abs_mvd_minus2 syntax element (or other syntax element for signaling an MVD) may be determined using any of the examples provided elsewhere in this disclosure.

In accordance with an example of this disclosure that uses a template-based Rice parameter derivation method, a function sum_template(k) is defined to return the number of coefficients in a template that their magnitudes are larger than k as:

$$\text{sum\_template}(k) = \sum \delta_j(x_i, k) \text{ with } \delta_j(x, k) = \begin{cases} 1 & |x_i| > k \\ 0 & x_i = 0 \end{cases}.$$

Furthermore, in this example, functions $f(x, y, n, t)$ are defined to handle the position information and $\delta_k(u,v)$ is defined to handle the component information as follows:

$$f(x, y, n, t) = \begin{cases} n & x+y < t \\ 0 & x+y \geq t \end{cases} \quad \delta_k(u, v) = \begin{cases} u & v = 0 \\ 0 & v \neq 0 \end{cases}$$

The template is depicted in FIG. 4. The current transform coefficient is marked as 'X' and its five spatial neighbors are marked as '$x_i$' (with i being 0 to 4). If one of the following two conditions is satisfied, $x_i$ is marked as unavailable and not used in the context index derivation process:
- Position of $x_i$ and current transform coefficient X are not located in the same transform unit;
- Position of $x_i$ is located out of picture horizontal or vertical boundary
- The transform coefficient $x_i$ has not been coded/decoded yet.

In accordance with some techniques of this disclosure, a video coder may perform context selection for significant_flag syntax elements (bin0's) of coefficient levels. To perform context selection, the video coder may determine or otherwise calculate a context index that identifies the selected context. In accordance with one such example, context index calculations for a bin0 are defined as follows:
For a bin0, the context index is derived as:

$$c_0 = \min(\text{sum\_template}(0),5) + f(x,y,6,2) + \delta_k(f(x,y,6,5), c\text{Idx})$$

$$c_0 = c_0 + \text{offset}(c\text{Idx}, \text{width})$$

wherein $$\text{offset}(v, w) = \begin{cases} w == 4?0: & (w == 8 ? NumberLumaCtxOneset: \quad v = 0 \\ & NumberLumaCtxOneset * 2) \\ & NumberLumaCtxOneset * 3 \quad v \neq 0 \end{cases}$$

In the equations above, prior to adding the offset, $c_0$ is the context index for bin0 and $c_0$ may range from 0 to 17. After adding the offset, $c_0$ may range from 0 to 53. Furthermore, in the equations above, the value sum_template is determined as described above, i.e., $$\text{sum\_template}(k) = \sum \delta_j(x_i, k) \text{ with } \delta_j(x, k) = \begin{cases} 1 & |x_i| > k \\ 0 & x_i = 0 \end{cases}.$$

In some examples, based on the range of $c_0$, one set of luma contexts includes NumberLumaCtxOneset, i.e., 18 context models. Different transform sizes (with the transform width denoted by 'w') for coding luma bin0's may select its own set. For instance, the video coder may use a first set of contexts for coding bin0's for luma samples in transform blocks of a first size, and may use a second, different set of contexts for coding bin0's for luma samples in transform blocks of a second, different size.

In addition, chroma and luma contexts can be separated to further improve the coding performance. For instance, for YCbCr inputs, the three color components (i.e., Y, Cb and Cr) may be represented with component index v equal to 0, 1, and 2, respectively. Thus, in this example, a video coder may select a coding context for arithmetic coding of a bin0 of a luma sample of a pixel and select a different coding context for arithmetic coding of a bin0 of a chroma sample of the same pixel.

Furthermore, in some examples, a video coder may select a context of arithmetic coding of a bin1 (e.g., a coeff_abs_level_greater1_flag) and a bin2 (e.g., a coeff_abs_level_greater2_flag) of a coefficient level. For instance, for a bin1, the context index ($c_1$) is derived as:

$$c_1 = \min(\text{sum\_template}(1), 4) + N$$

$$c = c_1 + \delta_k(x,y,5,3),c\text{Idx}) + \delta_k(x,y,5,10),c\text{Idx})$$

For a bin2, the context index ($c_2$) is derived as:

$$c_2 = \min(\text{sum\_template}(2), 4) + N$$

$$c_2 = c_2 + \delta_k(f(x,y,5,3),c\text{Idx}) + \delta_k(f(x,y,5,10),c\text{Idx})$$

In the equations above, N is equal to 1 and $f(x,y,n,t)$ is defined as above (i.e., $$f(x, y, n, t) = \begin{cases} n & x+y < t \\ 0 & x+y \geq t \end{cases}.$$

The first bin1 or bin2 is coded with the context index $c_1$ or $c_2$ equal to 0 and for other bin1s and bin2s, they are coded with context index equal to $c_1$ or $c_2$, respectively wherein $c_1$ and $c_2$ are defined above.

As indicated above, a video coder may binarize remaining bins (e.g., coeff_abs_level_remaining syntax elements) for a coefficient level with a Rice code or, when present, an Exp-Golomb code. In accordance with this example, the video coder may use both a statistics-based Rice parameter derivation method and a template-based Rice parameter derivation method to code coefficient levels of a signal TU. More specifically, in this example, the video coder uses both a statistics-based Rice parameter derivation method and a template-based Rice parameter derivation method to code remaining bins for coefficient levels of a signal TU. In this example, the following rules are applied to decide the Rice parameter order K of the Rice code or Exp-Golomb code.

Before decoding one transform unit, set variable prevK to 0

If it is the first value to be decoded, a variable $K_{temp}$ is set to $\text{cRicePara}_{Statistics}$. In other words, if the coeff_abs_level_remaining syntax element being coded is the first coeff_abs_level_remaining syntax element of a transform unit to be coded, a variable $K_{temp}$ is set to $\text{cRicePara}_{Statistics}$ Otherwise (it is not the first value to be decoded), variable $K_{temp}$ is set to $\text{cRicePara}_{Template}$ Set K equal to max(prevK, $K_{temp}$)

Update prevK: prevK=K−M

Thus, in this example, the video coder may apply a statistics-based Rice parameter derivation method to the first coeff_abs_level_remaining syntax element of a TU and may apply a template-based Rice parameter derivation method to each subsequent coeff_abs_level_remaining syntax element of the TU. In one example, M is set to 1. In another example, M is set to 0. Furthermore, in some instances of the example described in the previous paragraph, the derivation process of $\text{cRicePara}_{Statistics}$ is the same as the process for determining cRiceParam, as described elsewhere in this disclosure. In some instances of the example described in the previous paragraph, the derivation process of $\text{cRicePara}_{Template}$ follows the steps below in order:

Calculate sum_absolute_levelMinus1 following the way used in equation (7)

$$(\text{i.e., sum\_absolute\_levelMinus1} = \sum \delta_j(x_i))$$

$$\text{with } \delta_j(x) = \begin{cases} |x_i| - 1 & |x_i| > 0 \\ 0 & x_i = 0 \end{cases}$$

Set uiVal equal to sum_absolute_levelMinus1
Select K using the following pseudo code:

```
for ( iOrder = 0; iOrder < MAX_GR_ORDER_RESIDUAL; iOrder ++ )
{
    if( (1 << (iOrder + 3)) > (uiVal + 4))
    {
        break;
    }
}
K = (iOrder == MAX_GR_ORDER_RESIDUAL ?
(MAX_GR_ORDER_RESIDUAL - 1): iOrder);
```

Thus, in this example, the video coder sets K to whichever is smaller of the maximum allowed order or the smallest non-negative value of iOrder where (1<<(iOrder+3))> (uiVal+4). In one example, MAX_GR_ORDER_RESIDUAL is set to 10. In another example, MAX_GR_ORDER_RESIDUAL is set to 12.

Alternatively or furthermore, equation (7) may be modified as follows:

$$\text{sum\_absolute\_level} = \sum |x_i| \quad (7)$$

$$\text{sum\_absolute\_levelMinus1} = \sum \delta_j(x_i)$$

$$\text{with } \delta_j(x) = \begin{cases} ((|x_i| + \text{offset}) >> M) - 1 & |x_i| > 0 \\ 0 & x_i = 0 \end{cases}$$

In one example, in equation (7) above, M is set equal to the input/internal bit-depth minus 8. Alternatively, in equation (7) above, M is set to 0. Alternatively, the value of M is dependent on lossy/lossless coding mode, and/or input/internal bit-depth and/or intra/inter coding mode, and/or signaled value or derived value from previously coded information. In one example, offset is set to (1<<(M−1)). Alternatively, in some examples, offset is set to 0. Alternatively, the function $\delta_j(x)$ is defined as:

$$\delta_j(x) = \begin{cases} ((|x_i| + \text{offset}) >> M) - 1 & |x_i| > 0 \\ 0 & x_i = 0 \end{cases}$$

In some examples, SP(K) is a function returning a value used in determining a switch point (i.e., a value above which Exp-Golomb codes are used instead of Rice codes). In one example, SP(0)=SP(2)=6, SP(1)=5, and for the other values of K, SP(K) is equal to 3. Alternatively, furthermore, SP(K) is taken into consideration for equations (5) and (6) in the Statistics-based derivation method. In some examples, binarization of a coeff_abs_level_remaining syntax element is defined as:
  If the coeff_abs_level_remaining syntax element is less than (SP(K)<<K), K-th order Rice code is applied;
  Otherwise (coeff_abs_level_remaining is equal to or larger than (SP(K)<<K)), a prefix and suffix are used as the codeword, and the prefix is a SP(K) number of '1's and suffix is a K-th order Exp-Golomb code.

TABLE 1

Codeword of coeff_abs_level_remaining equal to m

| Value | K | |
|---|---|---|
| m | Prefix | Suffix |
| $0 \sim 2^K - 1$ | $0 X_0 X_1 \ldots X_{K-1}$ | N/A |
| $2^K \sim 2 \cdot 2^K - 1$ | $10 X_0 X_1 \ldots X_{K-1}$ | N/A |
| ... | | N/A |
| $(SP(K) - 1) \cdot 2^K \sim SP(K) \cdot 2^K - 1$ | $11 \ldots 0 X_0 X_1 \ldots X_{K-1}$ note: SP(K) − 1 '1's | N/A |
| $SP(K) \cdot 2^K \sim SP(K) \cdot 2^K + 2^K - 1$ | $11 \ldots 1*$ | $0 X_0 X_1 \ldots X_{K-1}$ |
| $SP(K) \cdot 2^K + 2^K \sim SP(K) \cdot 2^K + 2^K + 2^{K+1} - 1$ | $11 \ldots 1*$ | $10 X_0 X_1 \ldots X_{K-1} X_K$ |
| $SP(K) \cdot 2^K + 2^K + 2^{K+1} \sim SP(K) \cdot 2^K + 2^K + 2^{K+1} + 2^{K+2} - 1$ | $11 \ldots 1*$ | $110 X_0 X_1 \ldots X_{K-1} X_K X_{K+1}$ |
| ... | ... | ... |

In the table above, * denotes SP(K) '1' values. For instance, if SP(K) is 6, * represents six consecutive 1's.

Figure 5:
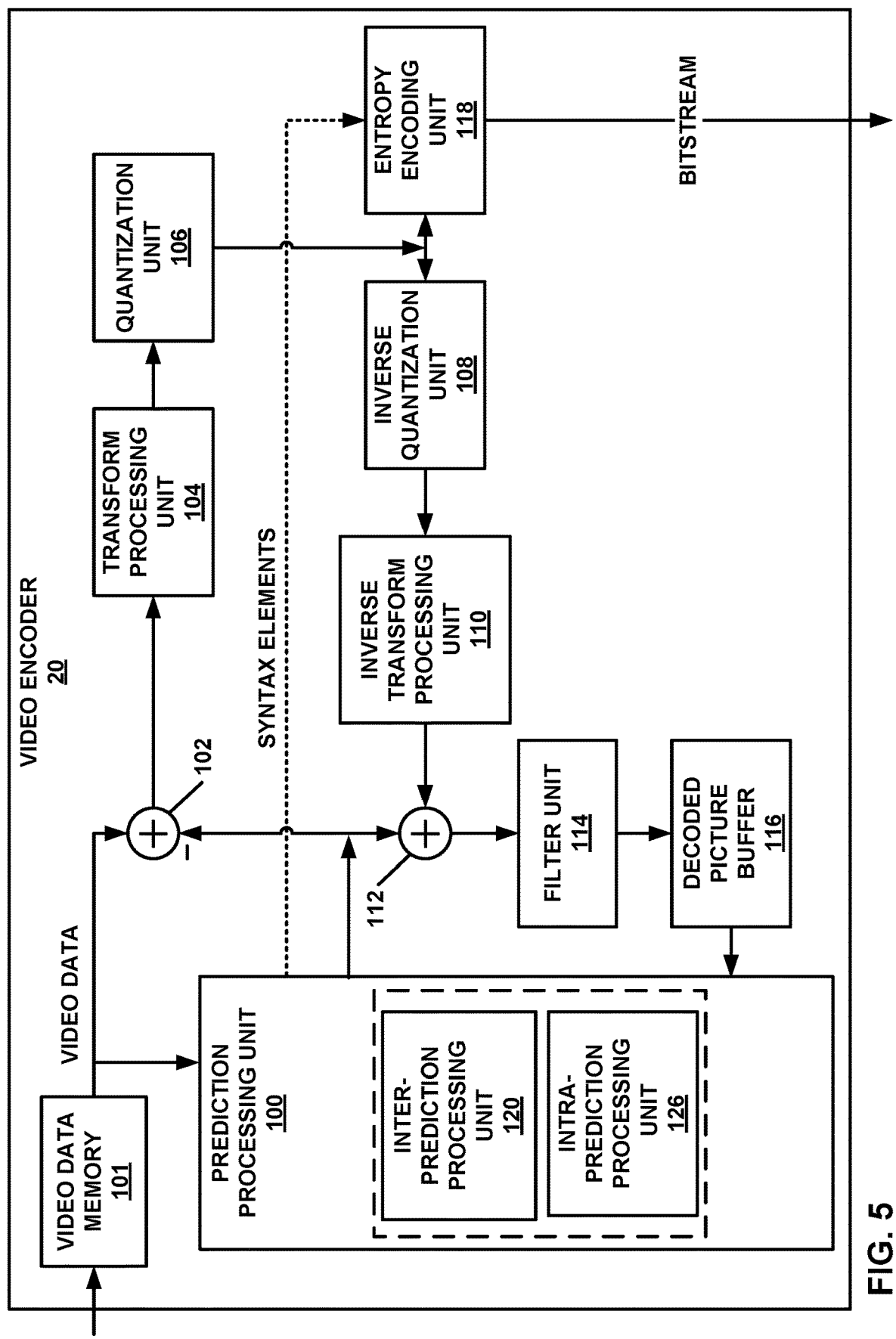
FIG. 5 is a block diagram illustrating an example video encoder that may implement the techniques described in this disclosure.

FIG. 5 is a block diagram illustrating an example video encoder 20 that may implement the techniques of this disclosure. FIG. 5 is provided for purposes of explanation and should not be considered limiting of the techniques as broadly exemplified and described in this disclosure. For purposes of explanation, this disclosure describes video encoder 20 in the context of HEVC coding. However, the techniques of this disclosure may be applicable to other coding standards or methods.

In the example of FIG. 5, video encoder 20 includes a prediction processing unit 100, video data memory 101, a residual generation unit 102, a transform processing unit 104, a quantization unit 106, an inverse quantization unit 108, an inverse transform processing unit 110, a reconstruction unit 112, a filter unit 114, a decoded picture buffer 116, and an entropy encoding unit 118. Prediction processing unit 100 includes an inter-prediction processing unit 120 and an intra-prediction processing unit 126. Inter-prediction processing unit 120 includes a motion estimation unit and a motion compensation unit (not shown). In other examples, video encoder 20 may include more, fewer, or different functional components.

Video data memory 101 may store video data to be encoded by the components of video encoder 20. The video data stored in video data memory 101 may be obtained, for example, from video source 18. Decoded picture buffer 116 may be a reference picture memory that stores reference video data for use in encoding video data by video encoder 20, e.g., in intra- or inter-coding modes. Video data memory 101 and decoded picture buffer 116 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 101 and decoded picture buffer 116 may be provided by the same memory device or separate memory devices. In various examples, video data memory 101 may be on-chip with other components of video encoder 20, or off-chip relative to those components.

Video encoder 20 receives video data. Video encoder 20 may encode each CTU in a slice of a picture of the video data. Each of the CTUs may be associated with equally-sized luma coding tree blocks (CTBs) and corresponding CTBs of the picture. As part of encoding a CTU, prediction processing unit 100 may perform quad-tree partitioning to divide the CTBs of the CTU into progressively-smaller blocks. The smaller block may be coding blocks of CUs. For example, prediction processing unit 100 may partition a CTB associated with a CTU into four equally-sized sub-blocks, partition one or more of the sub-blocks into four equally-sized sub-sub-blocks, and so on.

Video encoder 20 may encode CUs of a CTU to generate encoded representations of the CUs (i.e., coded CUs). As part of encoding a CU, prediction processing unit 100 may partition the coding blocks associated with the CU among one or more PUs of the CU. Thus, each PU may be associated with a luma prediction block and corresponding chroma prediction blocks. Video encoder 20 and video decoder 30 may support PUs having various sizes. The size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 120 may generate predictive data for a PU by performing inter prediction on each PU of a CU. The predictive data for the PU may include predictive blocks of the PU and motion information for the PU. Inter-prediction processing unit 120 may perform different operations for a PU of a CU depending on whether the PU is in an I slice, a P slice, or a B slice. In an I slice, all PUs are intra predicted. Hence, if the PU is in an I slice, inter-prediction processing unit 120 does not perform inter prediction on the PU. Thus, for blocks encoded in I-mode, the predicted block is formed using spatial prediction from previously-encoded neighboring blocks within the same frame. If a PU is in a P slice, inter-prediction processing unit 120 may use uni-directional inter prediction to generate a predictive block of the PU.

Intra-prediction processing unit 126 may generate predictive data for a PU by performing intra prediction on the PU. The predictive data for the PU may include predictive blocks of the PU and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive data for the PU. Intra-prediction processing unit 126 may use samples from sample blocks of neighboring PUs to generate a predictive block for a PU. The neighboring PUs may be above, above and to the right, above and to the left, or to the left of the PU, assuming a left-to-right, top-to-bottom encoding order for PUs, CUs, and CTUs. Intra-prediction processing unit 126 may use various numbers of intra prediction modes, e.g., 33 directional intra prediction modes. In some examples, the number of intra prediction modes may depend on the size of the region associated with the PU.

Prediction processing unit 100 may select the predictive data for PUs of a CU from among the predictive data generated by inter-prediction processing unit 120 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive blocks of the selected predictive data may be referred to herein as the selected predictive blocks.

Residual generation unit 102 may generate, based on the coding blocks (e.g., luma, Cb and Cr coding blocks) for a CU and the selected predictive blocks (e.g., predictive luma, Cb and Cr blocks) for the PUs of the CU, residual blocks (e.g., luma, Cb and Cr residual blocks) for the CU. For instance, residual generation unit 102 may generate the residual blocks of the CU such that each sample in the residual blocks has a value equal to a difference between a sample in a coding block of the CU and a corresponding sample in a corresponding selected predictive block of a PU of the CU.

Transform processing unit 104 may perform quad-tree partitioning to partition the residual blocks associated with a CU into transform blocks associated with TUs of the CU. Thus, a TU may be associated with a luma transform block and two chroma transform blocks. The sizes and positions of the luma and chroma transform blocks of TUs of a CU may or may not be based on the sizes and positions of prediction blocks of the PUs of the CU. A quad-tree structure known as a "residual quad-tree" (RQT) may include nodes associated with each of the regions. The TUs of a CU may correspond to leaf nodes of the RQT.

Transform processing unit 104 may generate transform coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually similar transform to a transform block. In some examples, transform processing unit 104 does not apply transforms to a transform block. In such examples, the transform block may be treated as a transform coefficient block.

Quantization unit 106 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization unit 106 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. Quantization may introduce loss of information, thus quantized transform coefficients may have lower precision than the original ones.

Inverse quantization unit 108 and inverse transform processing unit 110 may apply inverse quantization and inverse transforms to a coefficient block, respectively, to reconstruct a residual block from the coefficient block. Reconstruction unit 112 may add the reconstructed residual block to corresponding samples from one or more predictive blocks generated by prediction processing unit 100 to produce a reconstructed transform block associated with a TU. By reconstructing transform blocks for each TU of a CU in this way, video encoder 20 may reconstruct the coding blocks of the CU.

Filter unit 114 may perform one or more deblocking operations to reduce blocking artifacts in the coding blocks associated with a CU. Decoded picture buffer 116 may store the reconstructed coding blocks after filter unit 114 performs the one or more deblocking operations on the reconstructed coding blocks. Inter-prediction processing unit 120 may use a reference picture that contains the reconstructed coding blocks to perform inter prediction on PUs of other pictures. In addition, intra-prediction processing unit 126 may use reconstructed coding blocks in decoded picture buffer 116 to perform intra prediction on other PUs in the same picture as the CU.

Entropy encoding unit 118 may receive data from other functional components of video encoder 20. For example, entropy encoding unit 118 may receive coefficient blocks from quantization unit 106 and may receive syntax elements from prediction processing unit 100. Entropy encoding unit 118 may perform one or more entropy encoding operations on the data to generate entropy-encoded data. For example, entropy encoding unit 118 may perform a CABAC operation, a context-adaptive variable length coding (CAVLC) operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 118. For instance, the bitstream may include data that represents a RQT for a CU.

Entropy encoding unit 118 may be configured to perform techniques proposed in this disclosure. For example, entropy encoding unit 118 may use a first Rice parameter derivation method and a second Rice parameter derivation method for encoding coefficient levels of a single TU of a current CU of a picture. In this example, the first Rice parameter derivation method may be a statistics-based derivation method and the second Rice parameter derivation method may be a template-based derivation method. In this example, as part of encoding a coefficient level using either the first or second Rice parameter derivation methods, entropy encoding unit 118 may binarize a syntax element associated with the coefficient level (e.g., a coeff_abs_level_remaining syntax element) as a K-th order Rice or Exp-Golomb code word, where K is determined using the first or second Rice parameter derivation methods. Furthermore, in this example, entropy encoding unit 118 may perform arithmetic encoding on the code word.

Figure 6:
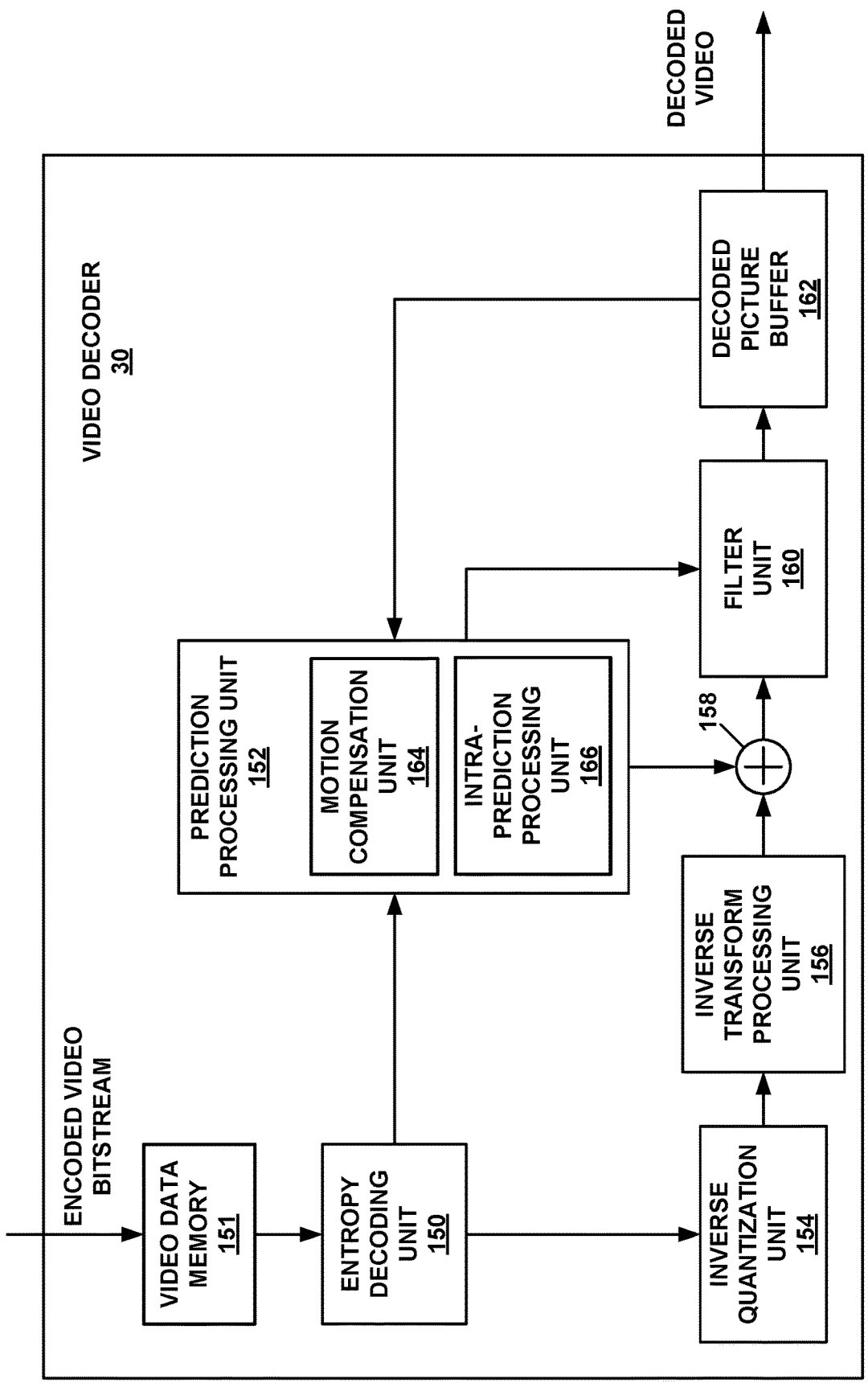
FIG. 6 is a block diagram illustrating an example video decoder that may implement the techniques described in this disclosure.

FIG. 6 is a block diagram illustrating an example video decoder 30 that is configured to implement the techniques of this disclosure. FIG. 6 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

In the example of FIG. 6, video decoder 30 includes an entropy decoding unit 150, video data memory 151, a prediction processing unit 152, an inverse quantization unit 154, an inverse transform processing unit 156, a reconstruction unit 158, a filter unit 160, and a decoded picture buffer 162. Prediction processing unit 152 includes a motion compensation unit 164 and an intra-prediction processing unit 166. In other examples, video decoder 30 may include more, fewer, or different functional components.

Video data memory 151 may store video data, such as an encoded video bitstream, to be decoded by the components of video decoder 30. The video data stored in video data memory 151 may be obtained, for example, from channel 16, e.g., from a local video source, such as a camera, via wired or wireless network communication of video data, or by accessing physical data storage media. Video data memory 151 may form a coded picture buffer (CPB) that stores encoded video data from an encoded video bitstream. Decoded picture buffer 162 may be a reference picture memory that stores reference video data for use in decoding video data by video decoder 30, e.g., in intra- or inter-coding modes. Video data memory 151 and decoded picture buffer 162 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 151 and decoded picture buffer 162 may be provided by the same memory device or separate memory devices. In various examples, video data memory 151 may be on-chip with other components of video decoder 30, or off-chip relative to those components.

Video data memory 151 receives and stores encoded video data (e.g., NAL units) of a bitstream. Entropy decoding unit 150 may receive encoded video data (e.g., NAL units) from the CPB and parse the NAL units to obtain syntax elements. Entropy decoding unit 150 may entropy decode entropy-encoded syntax elements in the NAL units. Prediction processing unit 152, inverse quantization unit 154, inverse transform processing unit 156, reconstruction unit 158, and filter unit 160 may generate decoded video data based on the syntax elements extracted from the bitstream. Entropy decoding unit 150 may perform a process generally reciprocal to that of entropy encoding unit 118.

As part of decoding the bitstream, entropy decoding unit 150 may extract and entropy decode syntax elements from the coded slice NAL units. Each of the coded slices may include a slice header and slice data. The slice header may contain syntax elements pertaining to a slice. Entropy encoding unit 118 may be configured to perform techniques proposed in this disclosure.

Entropy decoding unit 150 may perform at least parts of various examples of this disclosure. For example, entropy decoding unit 150 may debinarize binarized syntax elements, such as coeff_abs_level_remaining syntax elements. As part of debinarizing binarized syntax elements, entropy decoding unit 150 may determine Rice parameters in the manner described in examples provided elsewhere in this disclosure. For instance, in accordance with one example of this disclosure, entropy decoding unit 150 may use a first Rice parameter derivation method and a second Rice parameter derivation method for decoding coefficient levels of a single TU of a current CU of a picture, wherein the first Rice parameter derivation method is a statistics-based derivation method, and the second Rice parameter derivation method is a template-based derivation method.

In this example, as part of decoding a coefficient level using either the first or second Rice parameter derivation methods, entropy decoding unit 150 may perform arithmetic decoding to recover a code word for a syntax element associated with the coefficient level (e.g., a coeff_abs_level_remaining syntax element). In this example, entropy decoding unit 150 may interpret the code word as a K-th order Rice or Exp-Golomb code word, where K is determined using the first or second Rice parameter derivation methods. Furthermore, in this example, entropy decoding unit 150 may debinarize the Rice or Exp-Golomb code word by converting it back to an non-encoded number.

In addition to obtaining syntax elements from the bitstream, video decoder 30 may perform a reconstruction operation on a non-partitioned CU. To perform the reconstruction operation on a CU, video decoder 30 may perform a reconstruction operation on each TU of the CU. By performing the reconstruction operation for each TU of the CU, video decoder 30 may reconstruct residual blocks of the CU.

As part of performing a reconstruction operation on a TU of a CU, inverse quantization unit 154 may inverse quantize, i.e., de-quantize, coefficient blocks associated with the TU. Inverse quantization unit 154 may use a QP value associated with the CU of the TU to determine a degree of quantization and, likewise, a degree of inverse quantization for inverse quantization unit 154 to apply. That is, the compression ratio, i.e., the ratio of the number of bits used to represent original sequence and the compressed one, may be controlled by adjusting the value of the QP used when quantizing transform coefficients. The compression ratio may also depend on the method of entropy coding employed.

After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

If a PU is encoded using intra prediction, intra-prediction processing unit 166 may perform intra prediction to generate predictive blocks of the PU. Intra-prediction processing unit 166 may use an intra prediction mode to generate the predictive blocks of the PU based on samples spatially-neighboring blocks. Intra-prediction processing unit 166 may determine the intra prediction mode for the PU based on one or more syntax elements obtained from the bitstream.

If a PU is encoded using inter prediction, entropy decoding unit 150 may determine motion information for the PU. Motion compensation unit 164 may determine, based on the motion information of the PU, one or more reference blocks. Motion compensation unit 164 may generate, based on the one or more reference blocks, predictive blocks (e.g., predictive luma, Cb and Cr blocks) for the PU.

Prediction processing unit 152 may construct a first reference picture list (RefPicList0) and a second reference picture list (RefPicList1) based on syntax elements extracted from the bitstream. Furthermore, if a PU is encoded using inter prediction, entropy decoding unit 150 may extract motion information for the PU. Motion compensation unit 164 may determine, based on the motion information of the PU, one or more reference regions for the PU. Motion compensation unit 164 may generate, based on sample blocks at the one or more reference blocks for the PU, predictive luma, Cb and Cr blocks for the PU.

Reconstruction unit 158 may use transform blocks (e.g., luma, Cb and Cr transform blocks) for TUs of a CU and the predictive blocks (e.g., luma, Cb and Cr blocks) of the PUs of the CU, i.e., either intra-prediction data or inter-prediction data, as applicable, to reconstruct the coding blocks (e.g., luma, Cb and Cr coding blocks) for the CU. For example, reconstruction unit 158 may add samples of the transform blocks (e.g., luma, Cb and Cr transform blocks) to corresponding samples of the predictive blocks (e.g., luma, Cb and Cr predictive blocks) to reconstruct the coding blocks (e.g., luma, Cb and Cr coding blocks) of the CU.

Filter unit 160 may perform a deblocking operation to reduce blocking artifacts associated with the coding blocks of the CU. Video decoder 30 may store the coding blocks of the CU in decoded picture buffer 162. Decoded picture buffer 162 may provide reference pictures for subsequent motion compensation, intra prediction, and presentation on a display device, such as display device 32 of FIG. 1. For instance, video decoder 30 may perform, based on the blocks in decoded picture buffer 162, intra prediction or inter prediction operations for PUs of other CUs.

Figure 7:
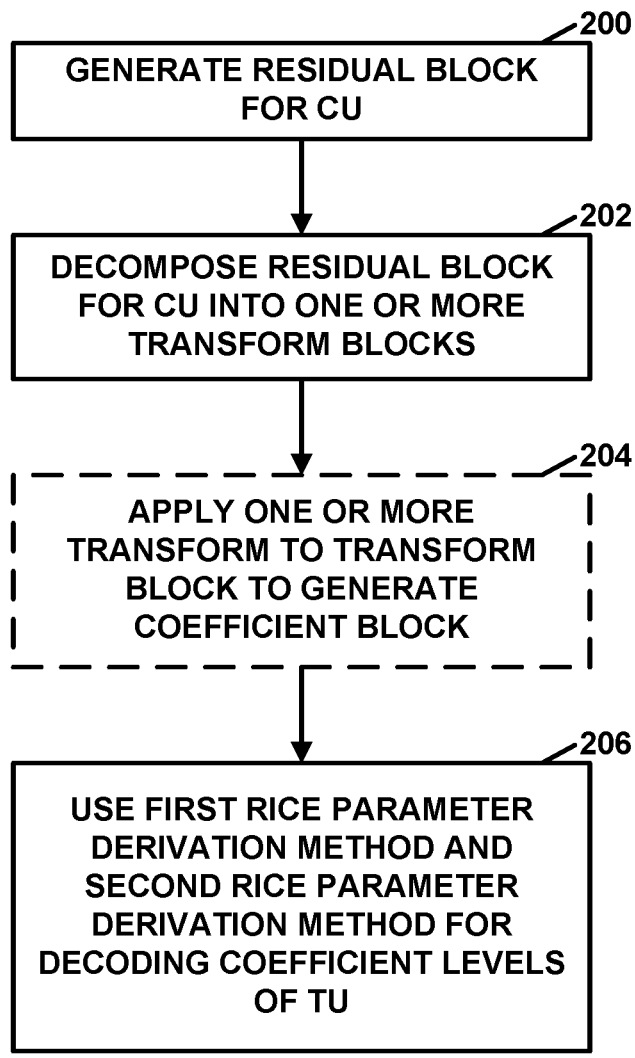
FIG. 7 is a flowchart illustrating an example operation for encoding video data, in accordance with a technique of this disclosure.

FIG. 7 is a flowchart illustrating an example operation for encoding video data, in accordance with a technique of this disclosure. FIG. 7, like the other flowcharts of this disclosure are provided as examples. Other examples may include more, fewer, or different actions, or actions may be performed in different orders.

In the example of FIG. 7, video encoder 20 generates a residual block for a CU of a picture of the video data (200). Each sample in the residual block may indicate a difference between a sample in a predictive block for a PU of the CU and a corresponding sample in a coding block of the CU. Furthermore, video encoder 20 may decompose the residual block for the CU into one or more transform blocks (202). A TU of the CU comprises a transform block of the one or more transform blocks. In some examples, video encoder 20 may use quad-tree partitioning to decompose the residual block for the CU into the one or more transform blocks. Furthermore, in some examples, video encoder 20 applies one or more transforms to a transform block for the TU to generate a coefficient block for the TU comprising coefficient levels of the TU (204). For instance, video encoder 20 may apply a discrete cosine transform (DCT) to the transform block. In other examples, video encoder 20 skips application of the transform. Thus, the coefficient levels of the TU may be residual values.

Additionally, video encoder 20 may use a first Rice parameter derivation method and a second Rice parameter derivation method for encoding the coefficient levels of the TU (206). In this example, the first Rice parameter derivation method is a statistics-based derivation method and the second Rice parameter derivation method is a template-based derivation method.

Figure 8:
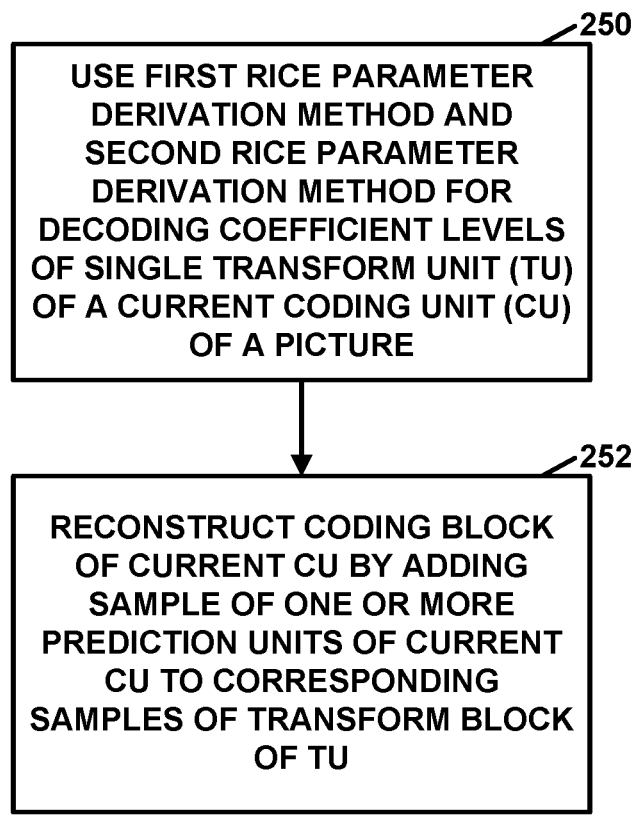
FIG. 8 is a flowchart illustrating an example operation for decoding video data, in accordance with a technique of this disclosure.

FIG. 8 is a flowchart illustrating an example operation for decoding video data, in accordance with a technique of this disclosure. In the example of FIG. 8, video decoder 30 uses a first Rice parameter derivation method and a second Rice parameter derivation method for decoding coefficient levels of a single TU of a current CU of a picture (250). In this example, the first Rice parameter derivation method is a statistics-based derivation method and the second Rice parameter derivation method is a template-based derivation method. Furthermore, in this example, video decoder 30 may reconstruct a coding block of the current CU by adding samples of one or more prediction units of the current CU to corresponding samples of a transform block of the TU (252). For instance, video decoder 30 may use intra prediction or inter prediction to determine predictive blocks of the one or more PUs of the current CU. Additionally, video decoder 30 may apply an inverse transform to the coefficient levels of TUs of the current CU to determine the samples of the transform blocks of the TUs of the current CU. In some examples, video decoder 30 may inverse quantize the samples of the transform blocks prior to applying the inverse transform.

Figure 9:
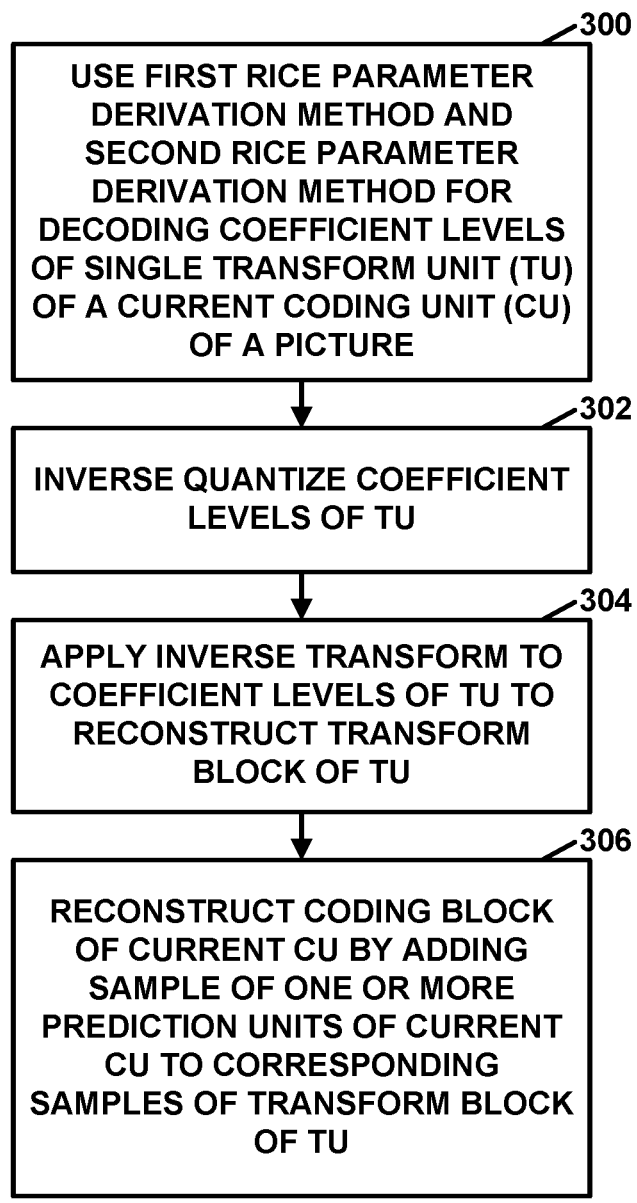
FIG. 9 is a flowchart illustrating an example operation for decoding video data, in accordance with a technique of this disclosure.

FIG. 9 is a flowchart illustrating an example operation for decoding video data, in accordance with a technique of this disclosure. In the example of FIG. 9, video decoder 30 may use a first Rice parameter derivation method and a second Rice parameter derivation method for decoding coefficient levels of a single TU of a current CU of a picture (300). In this example, the first Rice parameter derivation method is a statistics-based derivation method and the second Rice parameter derivation method is a template-based derivation method. Furthermore, video decoder 30 may inverse quantize coefficient levels of the TU (302). Additionally, video decoder 30 may apply an inverse transform to the coefficient levels of the TU to reconstruct a transform block of the TU (304). Video decoder 30 may reconstruct a coding block of the current CU by adding samples of one or more prediction units of the current CU to corresponding samples of a transform block of the TU (306). For instance, video decoder 30 may use intra prediction or inter prediction to determine predictive blocks of the one or more PUs of the current CU. Additionally, video decoder 30 may apply an inverse transform to the coefficient levels of TUs of the current CU to determine the samples of the transform blocks of the TUs of the current CU. In some examples, video decoder 30 may inverse quantize the samples of the transform blocks prior to applying the inverse transform.

Figure 10:
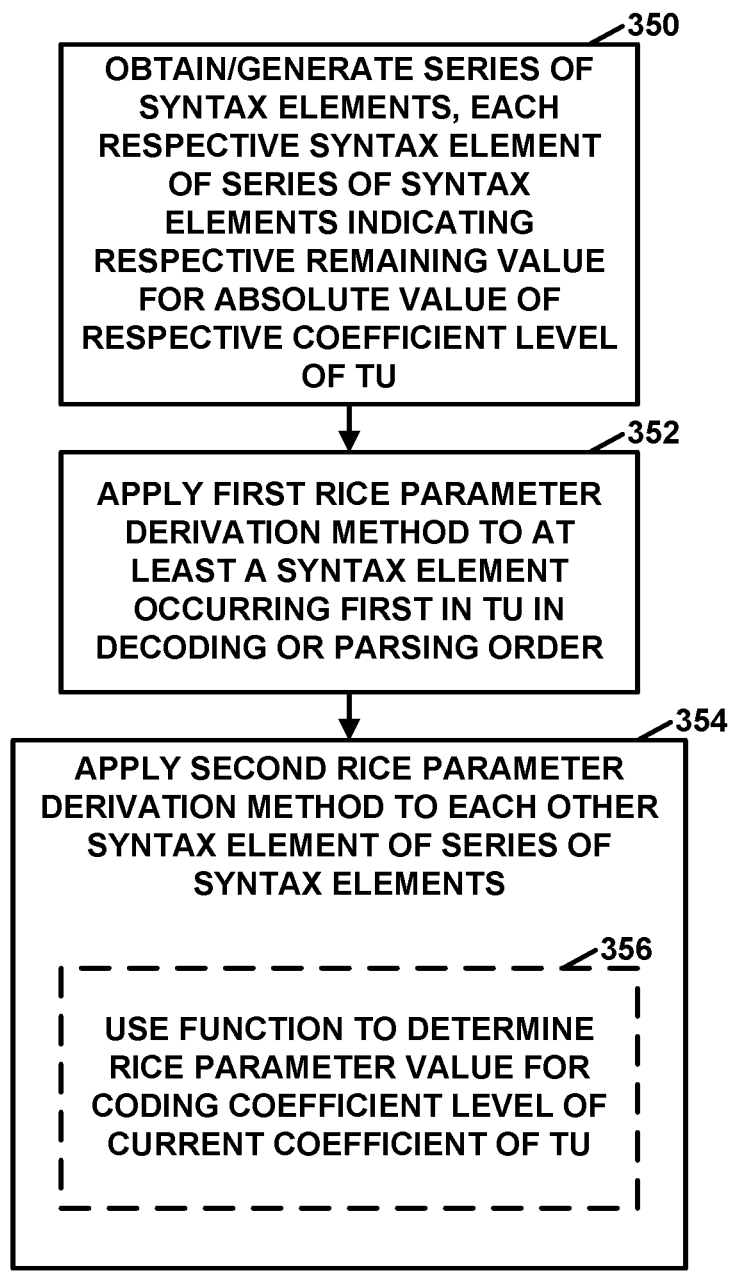
FIG. 10 is a flowchart illustrating an example operation for coding video data, in accordance with a technique of this disclosure.

FIG. 10 is a flowchart illustrating an example operation for coding video data, in accordance with a technique of this disclosure. The operation of FIG. 10 may be used as part of the example operations of FIGS. 7-9.

In the example of FIG. 10, a video coder obtains (e.g., if the video coder is a video decoder, such as video decoder 30) or generates (e.g., if the video coder is a video encoder, such as video encoder 20) a series of syntax elements (350). Each respective syntax element of the series of syntax elements indicates a respective remaining value for an absolute value of a respective coefficient level of the TU. In general, generating a syntax element may comprise determining a value of the syntax element and storing the value of the syntax element in a computer readable storage medium. Furthermore, in the example of FIG. 10, as part of using the first Rice parameter derivation method and the second Rice parameter derivation method for decoding coefficient levels of the single TU (e.g., in actions 204 of FIG. 7, 250 of FIG. 8, and 300 of FIG. 9), the video coder may apply the first Rice parameter derivation method to a syntax element occurring first in the TU in a decoding or parsing order, where the syntax element is in the series of syntax elements (352). In general, parsing order is an order in which a process sets syntax values from a coded binary bitstream.

Additionally, as part of using the first Rice parameter derivation method and the second Rice parameter derivation method for decoding coefficient levels of the single TU (e.g., in actions 204 of FIG. 7, 250 of FIG. 8, and 300 of FIG. 9), the video coder may apply the second Rice parameter derivation method to each other syntax element of the series of syntax elements (354). In some examples, as part of applying the second Rice parameter derivation method to each other syntax element of the series of syntax elements, the video coder may use a function to determine a Rice parameter value for coding a coefficient level of a current coefficient of the TU (356). Inputs of the function may include a recorded value and a current derived Rice parameter value. The recorded value may be based on a Rice parameter value used to decode a coefficient previous to the current coefficient. Furthermore, the current derived Rice parameter value may be derived using the template-based derivation method. The function may be the maximum function.

Figure 11:
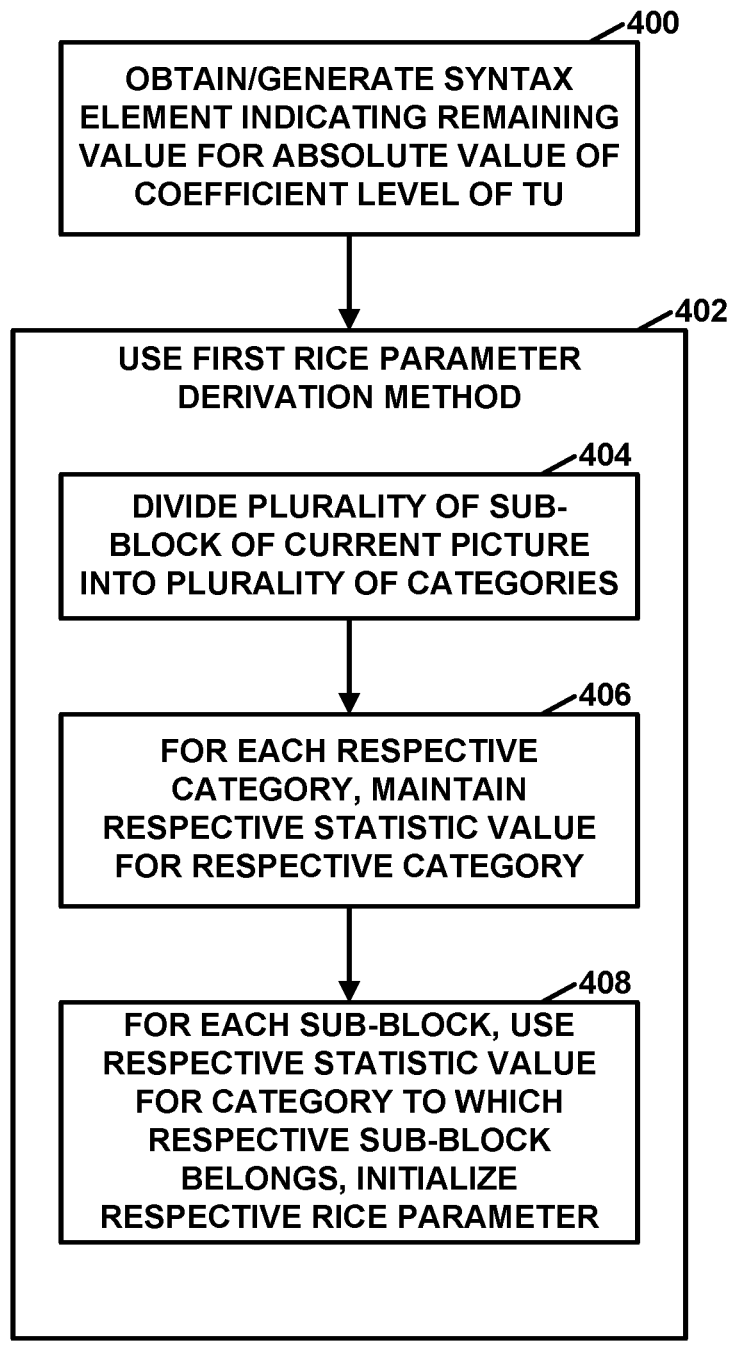
FIG. 11 is a flowchart illustrating an example operation in which a video coder uses statistics-based derivation method, in accordance with a technique of this disclosure.

FIG. 11 is a flowchart illustrating an example operation in which a statistics-based derivation method is used, in accordance with a technique of this disclosure. A video coder, such as video encoder 20 or video decoder 30, may perform the operation of FIG. 11 as part of performing the operations of any of FIGS. 7-9. In the example of FIG. 11, a current picture comprises a plurality of 4×4 sub-blocks and the video coder is configured to obtain (e.g., if the video coder is a video decoder, such as video decoder 30) or generate (e.g., if the video coder is a video encoder, such as video encoder 20) a syntax element indicating a respective remaining value for an absolute value of a coefficient level of a TU of the current picture (400). Additionally, as discussed elsewhere in this disclosure, the video coder may use a first Rice parameter derivation method and a second Rice parameter derivation method for decoding coefficient levels of the TU. In this example, the first Rice parameter derivation method is a statistics-based derivation method and the second Rice parameter derivation method is a template-based derivation method.

As part of using the first Rice parameter derivation method (402), the video coder may divide the plurality of sub-blocks of the current picture into a plurality of categories such that, for respective sub-blocks of the plurality of sub-blocks, the respective sub-block is categorized based on whether the respective sub-block is a transform-skip block and whether the respective sub-block is for a luma component (404).

Additionally, for each respective category of the plurality of categories, the video coder may maintain a respective statistic value (e.g., statCoeff) for the respective category (406). In some examples, as part of maintaining the respective statistic value for the respective category, the video coder may, for each respective category of the plurality of categories and for each respective sub-block of the picture that belongs to the respective category, update the respective statistic value for the respective category at most once for the respective sub-block using a level remaining syntax element coded first for the respective sub-block. As part of updating the respective statistic value for the respective category, the video coder may increment the respective statistic value for the respective category if (absCoeffLevel>=3*(1<<(statCoeff/4))) and decrement the respective statistic value for the respective category if ((2*absCoeffLevel)<(1<<(statCoeff/4))), where absCoeffLevel is an absolute coefficient level of the respective sub-block and statCoeff is the respective statistic value for the respective category.

For each respective sub-block of the plurality of sub-blocks, the video coder may use the respective statistic value for the category to which the respective sub-block belongs to initialize a respective Rice parameter (408). The video coder may binarize the syntax element using a K-th order Rice code, K being the determined Rice parameter. In some examples, as part of using the respective statistic value for the category to which the respective sub-block belongs to initialize a respective Rice parameter for the respective sub-block, the video coder may, for each respective sub-block of the plurality of sub-blocks, determine the respective Rice parameter for the respective sub-block as a minimum of a maximum Rice parameter and the respective statistic value for the category to which the respective sub-block belongs divided by 4.

Figure 12:
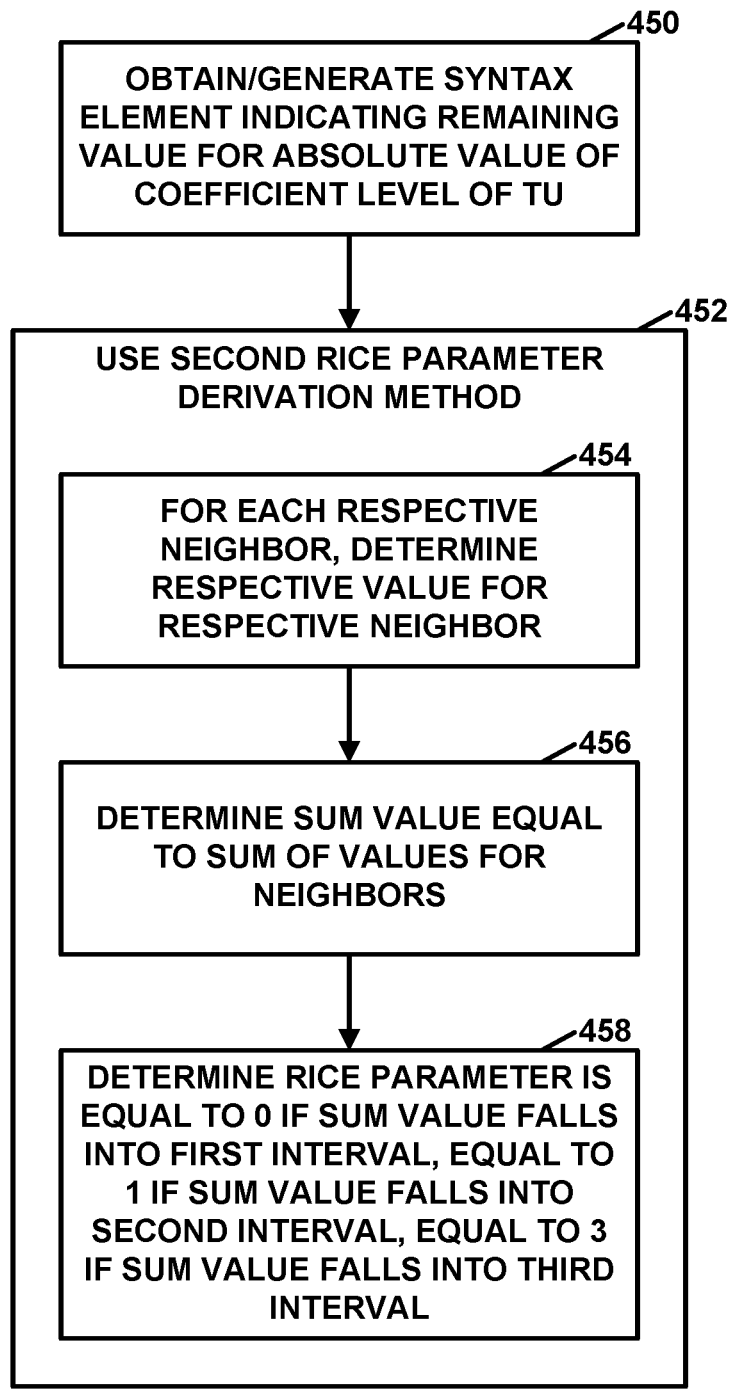
FIG. 12 is a flowchart illustrating an example operation in which a video coder uses a template-based derivation method, in accordance with a technique of this disclosure.

FIG. 12 is a flowchart illustrating an example operation in which a template-based derivation method is used, in accordance with a technique of this disclosure. A video coder, such as video encoder 20 or video decoder 30, may perform the operation of FIG. 12 as part of performing the operations of any of FIGS. 7-9.

In the example of FIG. 12, a current picture comprises a plurality of 4×4 sub-blocks, a local template covers neighbors of a current sample of a TU of a CU of the current picture, and the current sample is at a current scan position. In the example of FIG. 12, a video coder, such as video encoder 20 or video decoder 30, may obtain (e.g., if the video coder is a video decoder, such as video decoder 30) or generate (e.g., if the video coder is a video encoder, such as video encoder 20) a syntax element (e.g., coeff_abs_level_remaining) indicating a respective remaining value for an absolute value of a respective coefficient level for the current sample (450).

As discussed elsewhere in this disclosure, the video coder may use a first Rice parameter derivation method and a second Rice parameter derivation method for decoding coefficient levels of the TU. In this example, the first Rice parameter derivation method is a statistics-based derivation method and the second Rice parameter derivation method is a template-based derivation method. As part of using the second Rice parameter derivation method (452), the video coder may, for each respective neighbor covered by the local template, determine a respective value (e.g., $\delta_j(x)$) for the respective neighbor (454). In this example, the respective value for the respective neighboring is equal to the absolute value of the neighbor minus 1 if the absolute value of the neighbor is greater than 0 and equal to 0 if the neighbor is equal to 0. Additionally, the video coder may determine a sum value (e.g., sum_absolute_levelMinus1) equal to a sum of values for the neighbors (456). Furthermore, in the example of FIG. 12, the video coder may determine a Rice parameter is equal to 0 if the sum value falls into a first interval, equal to 1 if the sum value falls into a second interval, equal to 2 if the sum value falls into a third interval, and equal to 3 if the sum value falls into a fourth interval (458). The syntax element is binarized using a K-th order Rice code, K being equal to the determined Rice parameter.

Figure 13:
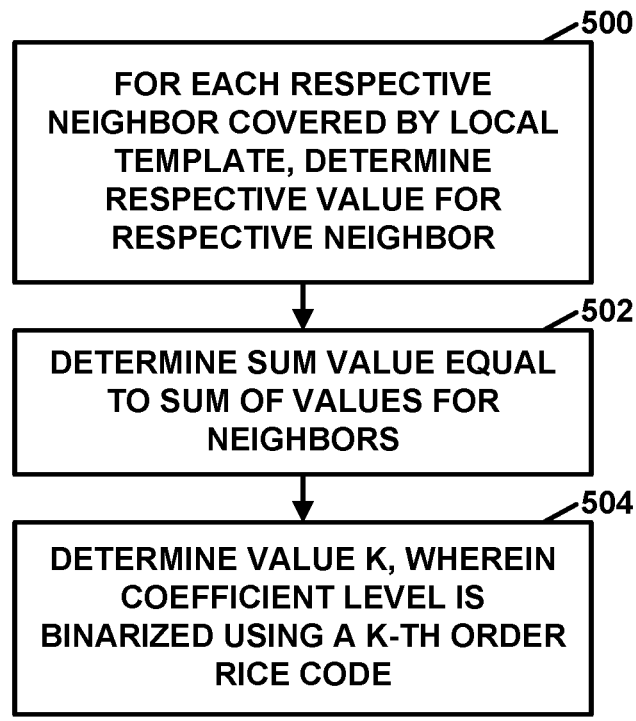
FIG. 13 is a flowchart illustrating an example operation to determine a Rice parameter based on a generic function, in accordance with a technique of this disclosure.

FIG. 13 is a flowchart illustrating an example operation to determine a Rice parameter based on a generic function, in accordance with a technique of this disclosure. The operation of FIG. 13 may be used separately or in conjunction with other examples of this disclosure. The operation of FIG. 13 may be one way of performing the template-based Rice parameter derivation process described in other flowcharts of this disclosure.

In the example of FIG. 13, a current picture comprises a plurality of 4×4 sub-blocks, a local template covers neighbors of a current sample of a TU of a CU of the current picture, and the current sample is at a current scan position. As part of using a template-based Rice parameter derivation method, a video coder may, for each respective neighbor covered by the local template, determine a respective value for the respective neighbor (500). The respective value for the respective neighboring is equal to the absolute value of the neighbor minus 1 if the absolute value of the neighbor is greater than 0 and equal to 0 if the neighbor is equal to 0. Furthermore, the video coder may determine a sum value equal to a sum of values for the neighbors (502). Additionally, the video coder may determine a value K (504). A coefficient level of the TU is binarized using a K-th order Rice code. For instance, video encoder 20 may binarizes the coefficient level and video decoder 30 may de-binarize the coefficient level.

In this example, a definition of K may be selected from a group consisting of:

K being defined as a minimum integer that satisfies $(1-(K+3))>(sum\_absolute\_levelMinus1+M)$, where M is an integer and sum_absolute_levelMinus1 is the sum value, K being defined as a minimum integer that satisfies $(1-(K+3))>(sum\_absolute\_levelMinus1+M)$, where M is an integer and sum_absolute_levelMinus1 is the sum value, and K being defined as a minimum integer that satisfies $(1-(K+3))>(sum\_absolute\_levelMinus1+M)$, where M is an integer and sum_absolute_levelMinus1 is the sum value.

Figure 14:
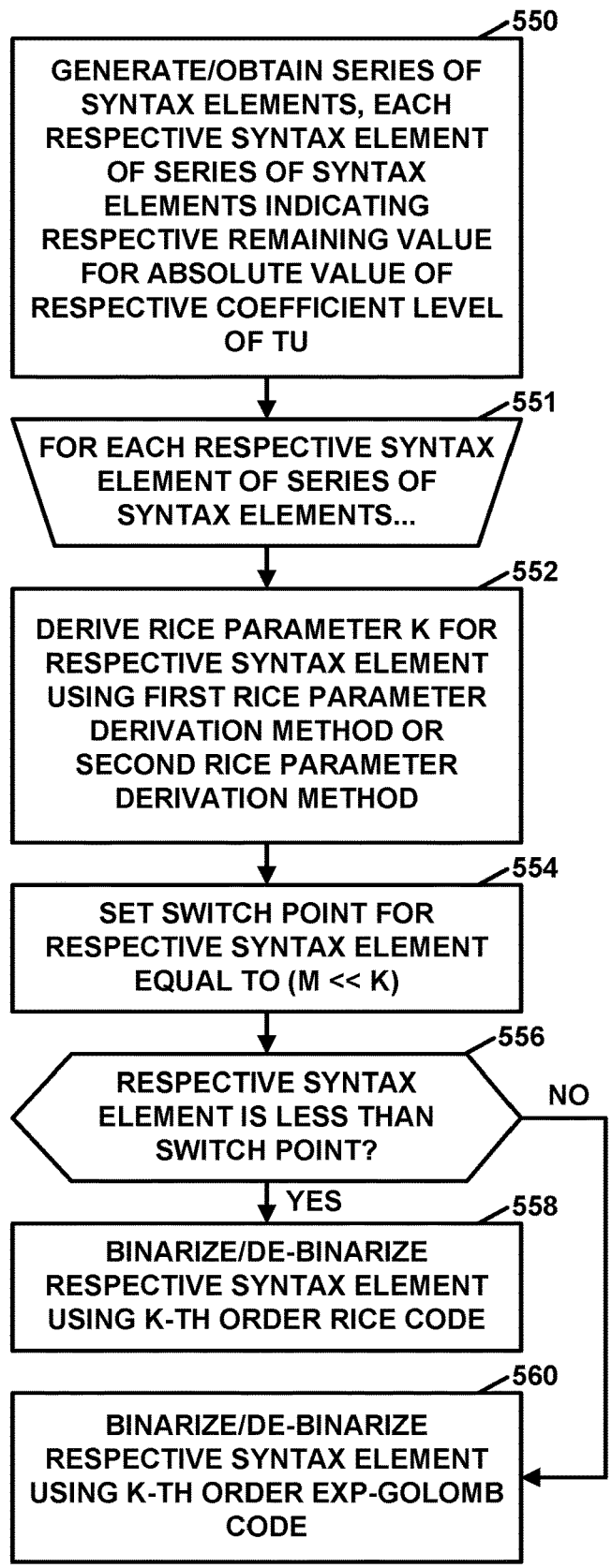
FIG. 14 is a flowchart illustrating an example operation for binarizing or debinarizing a series of syntax elements, in accordance with a technique of this disclosure.

FIG. 14 is a flowchart illustrating an example operation for binarizing or debinarizing a series of syntax elements, in accordance with a technique of this disclosure. The operation of FIG. 14 may be used separately or in conjunction with other examples of this disclosure. In the example of FIG. 14, a video coder (e.g., video encoder 20 or video decoder 30) generates or obtains a series of syntax elements (e.g., abs_coeff_level_remaining syntax elements) (550). In the example of FIG. 14, each respective syntax element of the series of syntax elements may indicate a respective remaining value for an absolute value of a respective coefficient level of the TU.

Furthermore, in the example of FIG. 14, the video coder may perform actions 552-560 for each respective syntax element of the series of syntax elements (551). In the example of FIG. 14, the video coder may derive a Rice parameter K for the respective syntax element using a first Rice parameter derivation method (e.g., a statistics-based Rice parameter derivation method) or a second Rice parameter derivation method (e.g., a template-based Rice parameter derivation method) (552). Furthermore, the video coder may set a switch point for the respective syntax element equal to (M<<K) (554). M is dependent on K. For example, the video coder may set M equal to 6, 5, and 6 for values of K equal to 0, 1, and 2, respectively, and may set M to 3 for all other values of K.

Furthermore, in the example of FIG. 14, the video coder may determine whether the respective syntax element is less than the switch point (556). In response to determining the respective syntax element is less than the switch point ("YES" branch of 556), the video coder may binarize or de-binarize the respective syntax element using a K-th order Rice code (558). Otherwise, if the respective syntax element is not less than the switch point ("NO" branch of 556), the video coder may binarize or de-binarize the respective syntax element using a K-th order Exp-Golomb code (560).

It should be understood that all of the techniques described herein may be used individually or in combination. It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially. In addition, while certain aspects of this disclosure are described as being performed by a single module or unit for purposes of clarity, it should be understood that the techniques of this disclosure may be performed by a combination of units or modules associated with a video coder.

Certain aspects of this disclosure have been described with respect to the HEVC standard for purposes of illustration. However, the techniques described in this disclosure may be useful for other video coding processes, including other standard or proprietary video coding processes not yet developed.

The techniques described above may be performed by video encoder 20 (FIGS. 1 and 5) and/or video decoder 30 (FIGS. 1 and 6), both of which may be generally referred to as a video coder. Likewise, video coding may refer to video encoding or video decoding, as applicable. Furthermore, although this disclosure has referred to the coeff_abs_level_remaining syntax element, the techniques of this disclosure may be applicable to differently-named syntax elements with the same semantics as the coeff_abs_level_remaining syntax element, or other syntax elements of a transform unit.

While particular combinations of various aspects of the techniques are described above, these combinations are provided merely to illustrate examples of the techniques described in this disclosure. Accordingly, the techniques of this disclosure should not be limited to these example combinations and may encompass any conceivable combination of the various aspects of the techniques described in this disclosure.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   decoding coefficient levels of a single transform unit (TU) of a current coding unit (CU) of a current picture of the video data using a first Rice parameter derivation method and a second Rice parameter derivation method, wherein:
      the first Rice parameter derivation method is a statistics-based derivation method,
      the second Rice parameter derivation method is a template-based derivation method, and
      the first Rice parameter derivation method and the second Rice parameter derivation method are both applied to syntax elements indicating a respective remaining value for an absolute value of a respective coefficient level of the TU;
   inverse quantizing the coefficient levels of the TU;
   applying an inverse transform to the coefficient levels of the TU to reconstruct a transform block of the TU; and
   reconstructing a coding block of the current CU by adding samples of one or more prediction units of the current CU to corresponding samples of the transform block of the TU.

2. The method of claim 1, further comprising:
   obtaining a series of coeff_abs_level remaining syntax elements, each respective coeff_abs_level remaining syntax element of the series of coeff_abs_level remaining syntax elements indicating a respective remaining value for an absolute value of a respective coefficient level of the TU; and
   wherein decoding coefficient levels of the single TU of the current CU of the current picture of the video data using the first Rice parameter derivation method and the second Rice parameter derivation method comprises:
      applying the first Rice parameter derivation method to a coeff_abs_level remaining syntax element occurring first in the TU in a decoding or parsing order, wherein the coeff_abs_level remaining syntax element is in the series of coeff_abs_level remaining syntax elements; and
      applying the second Rice parameter derivation method to each other coeff_abs_level remaining syntax element of the series of coeff_abs_level remaining syntax elements.

3. The method of claim 2, wherein applying the second Rice parameter derivation method to each other coeff_abs_level remaining syntax element of the series of coeff_abs_level remaining syntax elements comprises:
   using a function to determine a Rice parameter value for decoding a coefficient level of a current coefficient of the TU, wherein inputs of the function include a recorded value and a current derived Rice parameter value, the recorded value being based on a Rice parameter value used to decode a coefficient previous to the current coefficient, the current derived Rice parameter value derived using the template-based derivation method.

4. The method of claim 3, further comprising:
   setting the recorded value equal to the determined Rice parameter value for decoding the coefficient level of the current coefficient, minus 1.

5. The method of claim 4, further comprising:
   based on the recorded value being smaller than 0, resetting the recorded value to 0.

6. The method of claim 1, wherein decoding coefficient levels of the single TU of the current CU of the current picture of the video data using the second Rice parameter derivation method comprises:
   determining a value equal to an absolute sum of each level of a plurality of coefficient levels minus 1, wherein each respective coefficient level of the plurality of coefficient levels is in a region defined by a template;
   determining a Rice parameter based on the value; and
   generating, based on the Rice parameter, a decoded value for a current coefficient level of the TU.

7. The method of claim 1, further comprising:
   obtaining a series of coeff_abs_level remaining syntax elements, each respective coeff_abs_level remaining syntax element of the series of coeff_abs_level remaining syntax elements indicating a respective remaining value for an absolute value of a respective coefficient level of the TU,
   for each respective coeff_abs_level remaining syntax element of the series of coeff_abs_level remaining syntax elements:
      deriving a Rice parameter K for the respective coeff_abs_level remaining syntax element using the first Rice parameter derivation method or the second Rice parameter derivation method, and
      setting a switch point for the respective coeff_abs_level remaining syntax element equal to (M<<K), wherein:
         M is dependent on K,
         if the respective coeff_abs_level remaining syntax element is less than the switch point, the respective coeff_abs_level remaining syntax element is binarized using a K-th order Rice code, and
         if the respective coeff_abs_level remaining syntax element is greater than or equal to the switch point, the respective coeff_abs_level remaining syntax element is binarized using a prefix and a suffix using a K-th order Exp-Golomb code.

8. A method of encoding video data, the method comprising:
generating a residual block for a coding unit (CU) of a current picture of the video data, each sample in the residual block indicating a difference between a sample in a predictive block for a prediction unit (PU) of the CU and a corresponding sample in a coding block of the CU;
decomposing the residual block for the CU into one or more transform blocks, wherein a transform unit (TU) of the CU comprises a transform block of the one or more transform blocks; and
encoding coefficient levels of the TU using a first Rice parameter derivation method and a second Rice parameter derivation method, wherein:
the first Rice parameter derivation method is a statistics-based derivation method,
the second Rice parameter derivation method is a template-based derivation method, and
the first Rice parameter derivation method and the second Rice parameter derivation method are both applied to syntax elements indicating a respective remaining value for an absolute value of a respective coefficient level of the TU.

9. The method of claim 8, wherein:
the method further comprises generating a series of coeff_abs_level remaining syntax elements, each respective coeff_abs_level remaining syntax element of the series of coeff_abs_level remaining syntax elements indicating a respective remaining value for an absolute value of a respective coefficient level of the TU; and
wherein encoding coefficient levels of the single TU using the first Rice parameter derivation method and the second Rice parameter derivation method comprises:
applying the first Rice parameter derivation method to a coeff_abs_level remaining syntax element occurring first in the TU in a decoding or parsing order, wherein the coeff_abs_level remaining syntax element is in the series of coeff_abs_level remaining syntax elements; and
applying the second Rice parameter derivation method to each other coeff_abs_level remaining syntax element of the series of coeff_abs_level remaining syntax elements.

10. The method of claim 9, wherein applying the second Rice parameter derivation method to each other coeff_abs_level remaining syntax element of the series of coeff_abs_level remaining syntax elements comprises:
using a function to determine a Rice parameter value for encoding a coefficient level of a current coefficient of the TU, wherein inputs of the function include a recorded value and a current derived Rice parameter value, the recorded value being based on a Rice parameter value used to decode a coefficient previous to the current coefficient, the current derived Rice parameter value derived using the template-based derivation method.

11. The method of claim 10, further comprising:
setting the recorded value equal to the determined Rice parameter value for decoding the coefficient level of the current coefficient, minus 1.

12. The method of claim 8, wherein encoding coefficient levels of the TU using the second Rice parameter derivation method comprises:
determining a value equal to an absolute sum of each level of a plurality of coefficient levels minus 1, wherein each respective coefficient level of the plurality of coefficient levels is in a region defined by a template;
determining a Rice parameter based on the value; and
generating, based on the Rice parameter, an encoded value for a current coefficient level of the TU.

13. The method of claim 8, further comprising:
generating a series of coeff_abs_level remaining syntax elements, each respective coeff_abs_level remaining syntax element of the series of coeff_abs_level remaining syntax elements indicating a respective remaining value for an absolute value of a respective coefficient level of the TU; and
for each respective coeff_abs_level remaining syntax element of the series of coeff_abs_level remaining syntax elements:
deriving a Rice parameter K for the respective coeff_abs_level remaining syntax element using the first Rice parameter derivation method or the second Rice parameter derivation method,
setting a switch point for the respective coeff_abs_level remaining syntax element equal to (M<<K), wherein:
M is dependent on K,
for each respective coeff_abs_level remaining syntax element of the series of coeff_abs_level remaining syntax elements:
if the respective coeff_abs_level remaining syntax element is less than the switch point, binarizing the respective coeff_abs_level remaining syntax element using a K-th order Rice code, and
if the respective coeff_abs_level remaining syntax element is greater than or equal to the switch point, binarizing the respective coeff_abs_level remaining syntax element using a prefix and a suffix using a K-th order Exp-Golomb code.

14. The method of claim 8, wherein:
decomposing the residual block for the CU into the one or more transform blocks comprises using quad-tree partitioning to decompose the residual block for the CU into the one or more transform blocks, and
the method further comprises applying one or more transforms to the transform block for the TU to generate a coefficient block for the TU, the coefficient block for the TU comprising the coefficient levels of the TU.

15. A device for decoding video data, the device comprising:
a non-transitory computer-readable storage medium configured to store the video data; and
one or more processors configured to:
decode coefficient levels of a single transform unit (TU) of a current coding unit (CU) of a current picture of the video data using a first Rice parameter derivation method and a second Rice parameter derivation method, wherein:
the first Rice parameter derivation method is a statistics-based derivation method,
the second Rice parameter derivation method is a template-based derivation method, and
the first Rice parameter derivation method and the second Rice parameter derivation method are both applied to syntax elements indicating a respective remaining value for an absolute value of a respective coefficient level of the TU;

inverse quantize the coefficient levels of the TU;

apply an inverse transform to the coefficient levels of the TU to reconstruct a transform block of the TU; and reconstruct a coding block of the current CU by adding samples of one or more prediction units of the current CU to corresponding samples of the transform block of the TU.

16. The device of claim 15, wherein the one or more processors are configured to:

obtain a series of coeff_abs_level_remaining syntax elements, each respective coeff_abs_level_remaining syntax element of the series of coeff_abs_level_remaining syntax elements indicating a respective remaining value for an absolute value of a respective coefficient level of the TU; and wherein the one or more processors are configured such that, as part of using the first Rice parameter derivation method and the second Rice parameter derivation method for decoding coefficient levels of the single TU, the one or more processors:

apply the first Rice parameter derivation method to a coeff_abs_level_remaining syntax element occurring first in the TU in a decoding or parsing order, wherein the coeff_abs_level_remaining syntax element is in the series of coeff_abs_level_remaining syntax elements; and apply the second Rice parameter derivation method to each other coeff_abs_level_remaining syntax element of the series of coeff_abs_level_remaining syntax elements.

17. The device of claim 16, wherein the one or more processors are configured such that, as part of applying the second Rice parameter derivation method to each other coeff_abs_level_remaining syntax element of the series of coeff_abs_level_remaining syntax elements, the one or more processors:

use a function to determine a Rice parameter value for coding a coefficient level of a current coefficient of the TU, wherein inputs of the function include a recorded value and a current derived Rice parameter value, the recorded value being based on a Rice parameter value used to decode a coefficient previous to the current coefficient, the current derived Rice parameter value derived using the template-based derivation method.

18. The device of claim 17, wherein the one or more processors are further configured to:

set the recorded value equal to the determined Rice parameter value for decoding the coefficient level of the current coefficient, minus 1.

19. The device of claim 18, wherein the one or more processors are configured to:

based on the recorded value being smaller than 0, reset the recorded value to 0.

20. The device of claim 17, wherein the one or more processors are configured such that, as part of using the first Rice parameter derivation method, the one or more processors:

determine a value equal to an absolute sum of each level of a plurality of coefficient levels minus 1, wherein each respective coefficient level of the plurality of coefficient levels is in a region defined by a template;

determine a Rice parameter based on the value; and generate, based on the Rice parameter, a coded value for a current coefficient level of the TU.

21. The device of claim 20, wherein the current picture comprises a plurality of 4×4 sub-blocks, the template covers neighbors of a current sample of the TU, the current sample being at a current scan position, and the one or more processors are configured such that, as part of using the second Rice parameter derivation method, the one or more processors:

for each respective neighbor covered by the local template, determine a respective value for the respective neighbor, the respective value for the respective neighboring being equal to an absolute value of the neighbor minus 1 if the absolute value of the neighbor is greater than 0 and equal to 0 if the neighbor is equal to 0;

determine a sum value equal to a sum of values for the neighbors; and determine a value K, wherein a coefficient level of the TU is binarized using a K-th order Rice code and a definition of K is selected from a group consisting of:

K being defined as a minimum integer that satisfies $(1<<(K+3))>(\text{sum\_absolute\_levelMinus1}+M)$, where M is an integer and sum_absolute_levelMinus1 is the sum value, and K being defined as a minimum integer that satisfies $(1<<(K+3))\geq(\text{sum\_absolute\_levelMinus1}+M)$, where M is an integer and sum_absolute_levelMinus1 is the sum value.

22. The device of claim 21, wherein K is capped at a threshold.

23. The device of claim 15, wherein the one or more processors are configured to:

obtain a series of coeff_abs_level_remaining syntax elements, each respective coeff_abs_level_remaining syntax element of the series of coeff_abs_level_remaining syntax elements indicating a respective remaining value for an absolute value of a respective coefficient level of the TU, and for each respective coeff_abs_level_remaining syntax element of the series of coeff_abs_level_remaining syntax elements, the one or more processors are configured to:

derive a Rice parameter K for the respective coeff_abs_level_remaining syntax element using the first Rice parameter derivation method or the second Rice parameter derivation method, and set a switch point for the respective coeff_abs_level_remaining syntax element equal to $(M<<K)$, wherein:

M is dependent on K, for each respective coeff_abs_level_remaining syntax element of the series of coeff_abs_level_remaining syntax elements:

if the respective coeff_abs_level_remaining syntax element is less than the switch point, the respective coeff_abs_level_remaining syntax element is binarized using a K-th order Rice code, and if the respective coeff_abs_level_remaining syntax element is greater than or equal to the switch point, the respective coeff_abs_level_remaining syntax element is binarized using a prefix and a suffix using a K-th order Exp-Golomb code.

24. The device of claim 15, wherein:

the current picture comprises a plurality of 4×4 sub-blocks, the one or more processors are further configured to obtain a coeff_abs_level_remaining syntax element indicating a respective remaining value for an absolute value of a coefficient level of the TU, and the one or more processors are configured such that, as part of using the first Rice parameter derivation method, the one or more processors:
  divide the plurality of sub-blocks of the current picture into a plurality of categories such that, for respective sub-blocks of the plurality of sub-blocks, the respective sub-block is categorized based on whether the respective sub-block is a transform-skip block and whether the respective sub-block is for a luma component;
  for each respective category of the plurality of categories, maintain a respective statistic value for the respective category; and
  for each respective sub-block of the plurality of sub-blocks, use the respective statistic value for the category to which the respective sub-block belongs to initialize a respective Rice parameter for the respective sub-block,
wherein the coefficient level is in a particular sub-block of the plurality of 4×4 sub-blocks and the coeff_abs_level_remaining syntax element is binarized using a K-th order Rice code, K being the respective Rice parameter for the particular sub-block.

25. The device of claim 24, wherein:
for each respective category of the plurality of categories, the one or more processors are configured such that, as part of maintaining the respective statistic value for the respective category, the one or more processors:
  for each respective sub-block of the current picture that belongs to the respective category, update the respective statistic value for the respective category at most once for the respective sub-block using a level remaining syntax element coded first for the respective sub-block, wherein the one or more processors are configured such that, as part of updating the respective statistic value for the respective category, the one or more processors:
    increment the respective statistic value for the respective category if (absCoeffLevel>=3*(1<<(statCoeff/4))); and
    decrement the respective statistic value for the respective category if ((2*absCoeffLevel)<(1<<(statCoeff/4))),
    wherein absCoeffLevel is an absolute coefficient level of the respective sub-block and statCoeff is the respective statistic value for the respective category; and
for each respective sub-block of the plurality of sub-blocks, the one or more processors are configured such that, as part of using the respective statistic value for the category to which the respective sub-block belongs to initialize a respective Rice parameter for the respective sub-block, the one or more processors:
  determine the respective Rice parameter for the respective sub-block as a minimum of a maximum Rice parameter and the respective statistic value for the category to which the respective sub-block belongs divided by 4.

26. The device of claim 15, wherein:
the current picture comprises a plurality of 4×4 sub-blocks,
a local template covers neighbors of a current sample of the TU,
the current sample is at a current scan position,
the one or more processors are further configured to obtain a coeff_abs_level_remaining syntax element indicating a respective remaining value for an absolute value of a respective coefficient level for the current sample, and
the one or more processors are configured such that, as part of using the second Rice parameter derivation method, the one or more processors:
  for each respective neighbor covered by the local template, determine a respective value for the respective neighbor, the respective value for the respective neighboring being equal to an absolute value of the neighbor minus 1 if the absolute value of the neighbor is greater than 0 and equal to 0 if the neighbor is equal to 0;
  determine a sum value equal to a sum of values for the neighbors;
  determine a Rice parameter is equal to 0 if the sum value falls into a first interval, equal to 1 if the sum value falls into a second interval, equal to 2 if the sum value falls into a third interval, and equal to 3 if the sum value falls into a fourth interval; and
  wherein the coeff_abs_level_remaining syntax element is binarized using a K-th order Rice code, K being equal to the determined Rice parameter.

27. The device of claim 15, wherein the one or more processors are configured to:
  generate a residual block for the CU, each sample in the residual block indicating a difference between a sample in a predictive block for a prediction unit (PU) of the CU and a corresponding sample in a coding block of the CU;
  decompose the residual block for the CU into one or more transform blocks, wherein the TU comprises a transform block of the one or more transform blocks; and
  apply one or more transforms to the transform block to generate a coefficient block for the TU, the coefficient block for the TU comprising the coefficient levels of the TU.

28. A device for decoding video data, the device comprising:
  means for storing the video data;
  means for decoding coefficient levels of a single transform unit (TU) of a current coding unit (CU) of a current picture of the video data using a first Rice parameter derivation method and a second Rice parameter derivation method, wherein:
    the first Rice parameter derivation method is a statistics-based derivation method,
    the second Rice parameter derivation method is a template-based derivation method, and
    the first Rice parameter derivation method and the second Rice parameter derivation method are both applied to syntax elements indicating a respective remaining value for an absolute value of a respective coefficient level of the TU;
  means for inverse quantizing the coefficient levels of the TU;
  means for applying an inverse transform to the coefficient levels of the TU to reconstruct a transform block of the TU; and
  means for reconstructing a coding block of the current CU by adding samples of one or more prediction units of the current CU to corresponding samples of the transform block of the TU.

* * * * *